US012809306B2

(12) United States Patent
Hiramatsu et al.

(10) Patent No.: US 12,809,306 B2
(45) Date of Patent: Nov. 24, 2026

(54) CARTRIDGE INCLUDING TONER CONTAINING HYDROTALCITE PARTICLES

(71) Applicant: CANON KABUSHIKI KAISHA, Tokyo (JP)

(72) Inventors: Takashi Hiramatsu, Tokyo (JP); Daisuke Baba, Shizuoka (JP); Masatake Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/038,815

(22) Filed: Jan. 28, 2025

(65) Prior Publication Data

US 2025/0172901 A1 May 29, 2025

Related U.S. Application Data

(63) Continuation of application No. PCT/JP2023/025050, filed on Jun. 29, 2023.

(30) Foreign Application Priority Data

Jul. 28, 2022 (JP) ................................ 2022-120177
May 15, 2023 (JP) ................................ 2023-079803

(51) Int. Cl.
*G03G 21/16* (2006.01)
*G01N 23/2252* (2018.01)
(Continued)

(52) U.S. Cl.
CPC ..... *G03G 21/1814* (2013.01); *G01N 23/2252* (2013.01); *G03G 9/09708* (2013.01);
(Continued)

(58) Field of Classification Search
CPC ............... G03G 9/09708; G03G 9/097; G03G 9/09716; G03G 15/0812; G03G 15/80; G03G 21/1814; G01N 23/2252
See application file for complete search history.

(56) References Cited

U.S. PATENT DOCUMENTS 5,826,138 A 10/1998 Tsuru et al.
10,719,028 B2 7/2020 An et al.
(Continued)

FOREIGN PATENT DOCUMENTS

JP 2005-258145 A 9/2009
JP 2017-198929 A 11/2017
(Continued)

OTHER PUBLICATIONS

International Search Report and Written Opinion of the International Searching Authority in International Patent Application No. PCT/JP2023/025050.
(Continued)

*Primary Examiner* — Hoang X Ngo
(74) *Attorney, Agent, or Firm* — Venable LLP

(57) ABSTRACT

A conventional process cartridge is developed.
A rotatable developing roller, a developing frame for rotatably supporting the developing roller, toner including toner particles and an external additive, a toner accommodating portion for accommodating the toner, a supplying roller for supplying the toner to a surface of the developing roller in contact with the surface of the developing roller, a regulating blade for regulating a layer thickness of the toner carried on the surface of the developing roller in contact with the surface of the developing roller, and an electrical contact electrically connected to the supplying roller and the regulating blade and capable of receiving electric power from an outside are provided, wherein the toner includes hydrotalcite particles as the external additive, and in line analysis in STEM-EDS mapping analysis of the toner, fluorine exits inside the hydrotalcite particles.

14 Claims, 15 Drawing Sheets

(51) Int. Cl.

| | |
|---|---|
| ***G03G 9/097*** | (2006.01) |
| ***G03G 15/00*** | (2006.01) |
| ***G03G 15/08*** | (2006.01) |
| ***G03G 21/18*** | (2006.01) |

(52) U.S. Cl.

CPC ......... *G03G 15/0812* (2013.01); *G03G 15/80* (2013.01); *G03G 2215/0888* (2013.01); *G03G 2215/1619* (2013.01); *G03G 2215/1657* (2013.01)

(56) References Cited

U.S. PATENT DOCUMENTS

| | | | |
|---|---|---|---|
| 11,112,714 B2 | 9/2021 | Amano et al. | |
| 2013/0236217 A1 | 9/2013 | Nagatomo et al. | |
| 2017/0199476 A1* | 7/2017 | Santoh ................. | G03G 9/0806 |
| 2019/0354037 A1 | 11/2019 | Fukaya et al. | |
| 2020/0150555 A1* | 5/2020 | Ikada ................. | G03G 15/0812 |

FOREIGN PATENT DOCUMENTS

| | | |
|---|---|---|
| JP | 2018-124368 A | 8/2018 |
| JP | 2020-148928 A | 9/2020 |

OTHER PUBLICATIONS

Jul. 8, 2026 Extended Search Report in European Patent Application Pub. No. 23 846 171.9.

* cited by examiner

CARTRIDGE INCLUDING TONER CONTAINING HYDROTALCITE PARTICLES

TECHNICAL FIELD

The present invention relates to a cartridge.

TECHNICAL FIELD

In a developing device used in an image forming apparatus such as an electrophotographic printer or the like and in the cartridge detachably mountable to the image forming apparatus, image formation is carried out by supplying toner as a developer from a developer carrying member to an electrostatic latent image bearing member. In general, as regards toner supply to the developer carrying member, the toner is supplied to a surface of the developer carrying member by using a developer supplying member capable of containing the toner in a foam layer in the case of a one-component non-magnetic toner. The toner supplied to the surface of the developer carrying member is regulated to an appropriate toner amount by being regulated by a regulating blade contacted to the developer carrying member, and in addition, an electrical charge is imparted to the toner. At this time, in order to increase a toner supplying force, a potential difference is provided between the developer supplying member and the developer carrying member in some instances. Further, in order to impart an appropriate electrical charge to the toner, a potential difference is provided between a regulating member and the developer carrying member in some instances.

In Japanese Laid-Open Patent Application No. 2018-124368, a constitution in which a contact between a developer supplying member and a regulating member is made common and in which a voltage is applied to each of the members is described.

SUMMARY OF THE INVENTION

Problem to be Solved by the Invention

An object of the present invention is to provide a cartridge which further developed a conventional cartridge.

Means for Solving the Problem

From the above, a cartridge of the present invention includes a rotatable developing roller; a developing frame for rotatably supporting the developing roller; toner including toner particles and an external additive; a toner accommodating portion for accommodating the toner; a supplying roller for supplying the toner to a surface of the developing roller in contact with the surface of the developing roller; a regulating blade for regulating a layer thickness of the toner carried on the surface of the developing roller in contact with the surface of the developing roller; and an electrical contact electrically connected to the supplying roller and the regulating blade and capable of receiving electric power from an outside, wherein the toner includes hydrotalcite particles as the external additive, and wherein in line analysis in STEM-EDS mapping analysis of the hydrotalcite particles, fluorine exits inside the hydrotalcite particles.

Effect of the Invention

As described above, according to the present invention, it is possible to provide a cartridge which further developed the conventional cartridge.

EMBODIMENTS FOR CARRYING OUT THE INVENTION

In the following, with reference to the drawings, preferred embodiments of the present invention will be illustratively described in detail. However, dimensions, materials, and shapes of constituent parts described in the following embodiments, and relation arrangements and the like of these parts should be appropriately changed depending on constitutions and various conditions of an apparatus to which the present invention is applied. Accordingly, the scope of the present invention is not intended to be limited to only them unless otherwise specified.

Embodiment 1

1. Image Forming Apparatus

Figure 1:
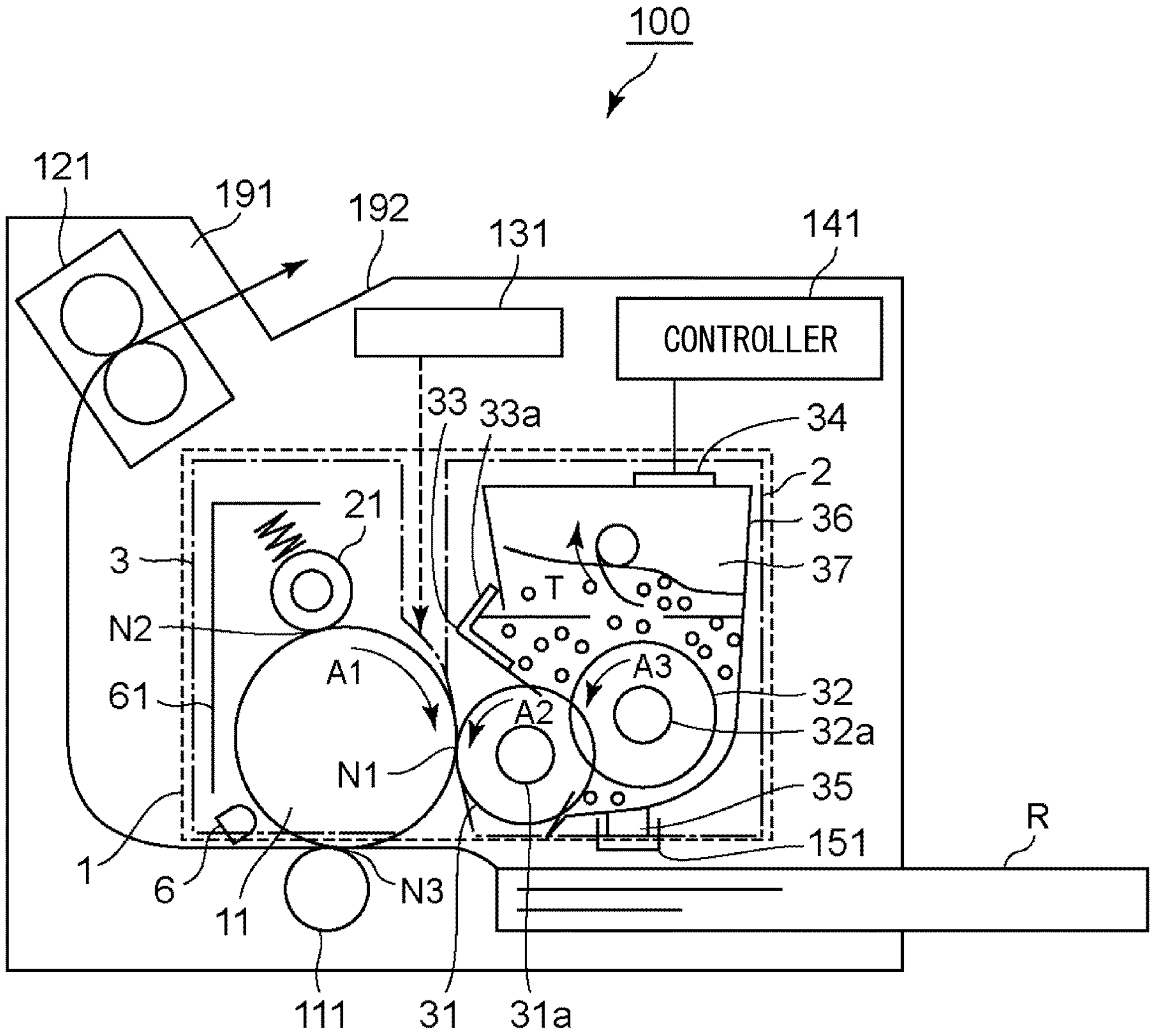
FIG. 1 is a schematic sectional view of an image forming apparatus of an embodiment 1.
Figure 3:
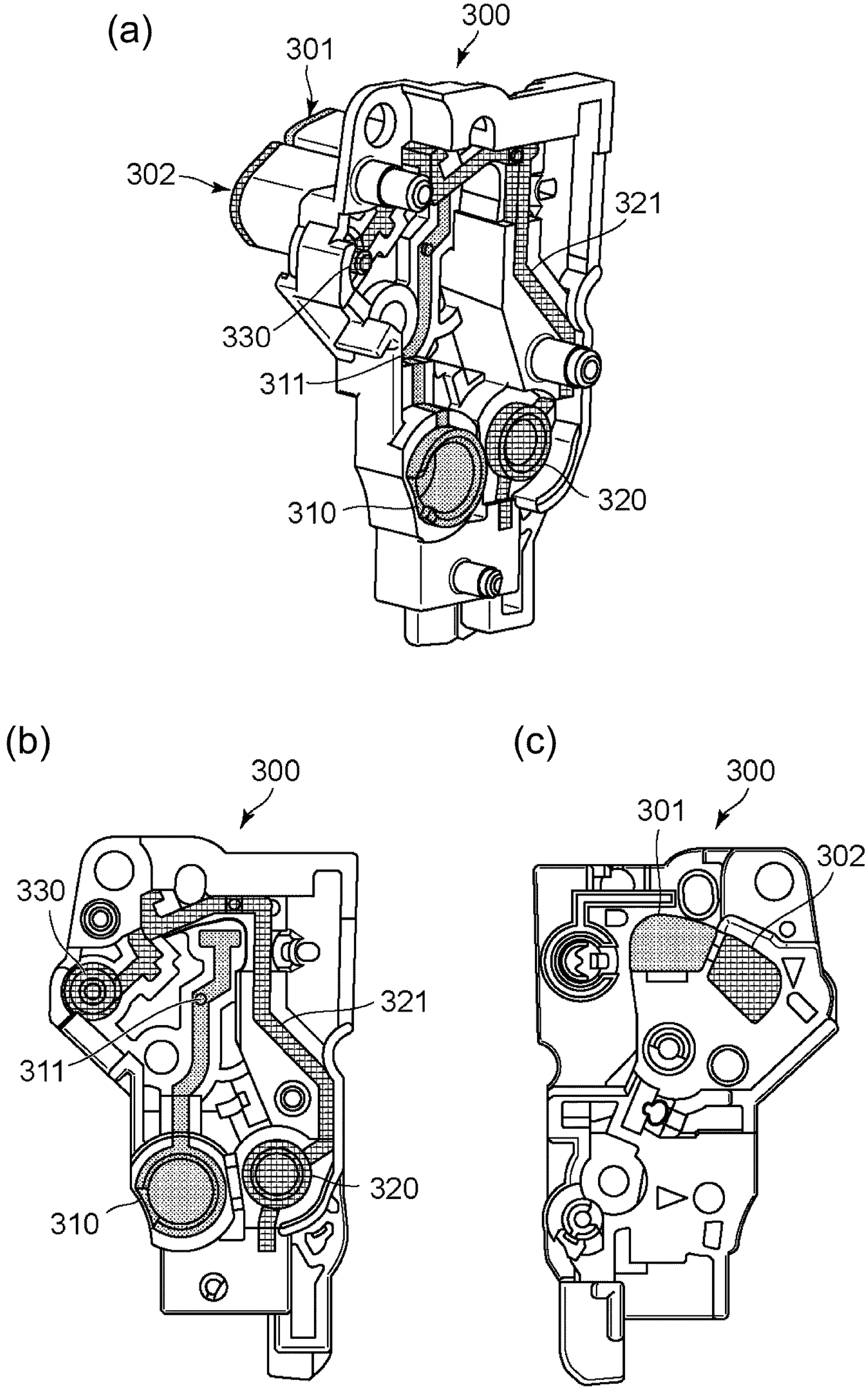
FIG. 3 includes views of voltage supplying (component) parts attached to a process cartridge 1 of the embodiment 1.

FIG. 3 is a view showing a schematic structure of an image forming apparatus 100 as a first embodiment according to the present invention. FIG. 1 shows a schematic structural view during image formation. However, constituent parts, dimensions, arrangement, and the like in the embodiment should be appropriately changed, and the scope of this invention is not limited.

With reference to FIG. 1, an entire structure of the image forming apparatus will be described. FIG. 1 shows the schematic structure of the image forming apparatus according to the embodiment of the present invention in cross section. The image forming apparatus 100 of this embodiment is a laser printer capable of forming a monochromatic image (black single image) with use of an electrophotographic type.

The image forming apparatus 100 includes rotatable drum-type (cylindrical) photosensitive member (photosensitive drum) 11 as an image bearing member. When an image forming operation is started, the photosensitive member 11 is rotationally driven in an arrow A1 direction (clockwise direction) in the figure by a driving force transmitted from a driving motor 161 (FIG. 2) as a driving source constituting a driving means. In this embodiment, the photosensitive member 11 is an organic photosensitive member including an electroconductive core metal formed of an electroconductive material such as aluminum, a charge generation layer formed on the electroconductive core metal, and a charge transport layer formed on the charge generation layer.

A surface of the rotating photosensitive member is charge-processed uniformly to a predetermined potential of a predetermined polarity (negative polarity in this embodiment) which is a normal polarity of toner by a charging roller 21 which is a roller-type charging member as a charging means. The charging roller 21 forms a charging portion N2 by being contacted to a surface (outer peripheral surface) of the photosensitive member 1 at a surface (outer peripheral surface) thereof. In this embodiment, the charging roller 21 is an elastic (body) roller constituted by covering a surface of a cylindrical electroconductive support with an elastic layer having a predetermined electrical resistance characteristic. This charging roller 21 is contacted to the surface of the photosensitive member 11 with a predetermined pressing force by being pressed by springs at both end portions thereof with respect to a rotational axis direction of the electroconductive support. The charging roller 21 is driven to rotate with rotation of the photosensitive member 11. During the charging process, to the charging roller 21, a predetermined charging voltage (charging bias) is applied at a predetermined timing from a charging power source 171 (FIG. 2) as a charging voltage applying means (charging voltage applying portion). In this embodiment, to the charging roller 21, as the charging voltage, a DC voltage of the negative polarity is applied. The uniformly charge-processed surface (non-image portion) of the photosensitive member 11 becomes a dark potential of the negative polarity.

The charge-processed surface of the photosensitive member 11 is subjected to scanning exposure to light by an exposure device (laser exposure unit) 131 as an exposure means (electrostatic image forming means), so that an electrostatic latent image (electrostatic image) is formed. The exposure device 131 performs exposure by scanning the surface of the photosensitive member 11 with a laser beam along a main scan direction (substantially parallel to a rotational axis direction of the photosensitive member 11) of the photosensitive member 11 depending on image information (image data). Further, depending on the image information, the exposure device 131 repeats the exposure along the main scan direction while matching a timing along a sub-scan direction (substantially parallel to a movement direction of the surface of the photosensitive member 11). By this, the electrostatic latent image is formed on the photosensitive member 11. An exposure portion (picture portion, image portion) which is an exposed surface of the photosensitive member 11 becomes a light potential.

The electrostatic latent image formed on the photosensitive member 11 is developed (visualized) by being supplied with toner as a developer by a developing device (developing unit) 2 as a developing means, so that a toner image (toner picture, developer image) is formed on the photosensitive member 11. In this embodiment, as the developer accommodated in the developing device 2, one-component non-magnetic toner is used. Details of the toner will be described later. The developing device 2 includes a developing roller 31 as a developer carrying member (developing member). During development, the developing roller 31 forms a developing portion N1 by being contacted to the surface (outer peripheral surface) of the photosensitive member 11 at a surface (outer peripheral surface) thereof. Further, during the development, to the developing roller 31, a predetermined developing voltage (developing bias) is applied at a predetermined timing from a development power source 172 (FIG. 2) as a developing voltage applying means (developing voltage applying portion). In this embodiment, to the developing roller 31, as the developing voltage, a DC voltage of the negative polarity is applied. In this embodiment, toner charged to the same polarity (negative polarity in this embodiment) as a charge polarity of the photosensitive member 11 is deposited on an exposure portion (picture portion, image portion) on the photosensitive member 11 lowered in absolute value of a potential by being exposed to light after being uniformly charge-processed (reverse development type). That is, in this embodiment, as described above, a normal charge polarity of the toner, which is a principal charge polarity of the toner during the development is the negative polarity. The development is performed by a potential difference (developing contrast) formed between the developing voltage applied to the developing roller 31 and the light potential on the photosensitive member 11, and therefore, to the developing roller 31, a predetermined developing voltage is applied. A magnitude of a surface potential formed on a surface of the developing roller 31 and a magnitude of the developing voltage applied to the developing roller 31 are substantially the same. The developing roller 31 is rotated in an arrow A2 direction (counterclockwise direction) (a movement direction in a contact portion is a forward direction) in FIG. 1, which is an opposite direction to the rotational direction of the photosensitive member 11. Further, in this embodiment, between a surface movement speed of the developing roller 31 and a surface movement speed of the photosensitive member 11, a speed difference (the surface movement speed of the developing roller 31 is faster) is provided. Also, the developing device 2 will be further described later. Here, the surface movement speed of each member may be called a rotational speed of each member.

Opposing the photosensitive member 11, a transfer roller 111 which is a roller-type transfer member as a transfer means is disposed. The transfer roller 111 is pressed toward the photosensitive member 11, and forms a transfer portion (transfer nip) N3 which is a contact portion between the photosensitive member 11 and the transfer roller 111. The toner image formed on the photosensitive member 11 is transferred onto a recording material R nipped and conveyed by the photosensitive member 11 and the transfer roller 111, by the action of the transfer roller 111 in the transfer portion N3. During the transfer, to the transfer roller 111, a predetermined transfer voltage (transfer bias) is applied at a predetermined timing from a transfer power source 174 (FIG. 2) as a transfer voltage applying means (transfer voltage applying portion). In this embodiment, to the transfer roller 111, as the transfer voltage, a DC voltage of the positive polarity which is the opposite polarity to the normal charge polarity of the toner is applied. A sheet-like recording material (transfer material, recording medium, sheet) R such as paper is supplied from a paper feeding portion (feeding portion) 181 toward the transfer portion N3. The paper feeding portion 181 includes a cassette 182 as a recording material accommodating portion, a conveying roller 183 as a conveying member, and the like. The recording material R is accommodated in the cassette 182, and is conveyed toward the transfer portion N3 by being timed to the toner image on the photosensitive member 11 by the conveying roller 183 or the like. As regards the paper feeding portion 181, refer to FIG. 11 described later.

The recording material R on which the toner image is transferred is conveyed toward a fixing device 121 as a fixing means. The fixing device 121 applies heat and pressure to the recording material R on which an unfixed toner image is carried, and fixes (melts, sticks) the toner image on the recording material R. The recording material R on which the toner image is fixed is discharged (outputted) from a paper discharging portion (discharging portion) 191, and is stuck on a tray 192 provided at an upper portion of the image forming apparatus 100.

Figure 11:
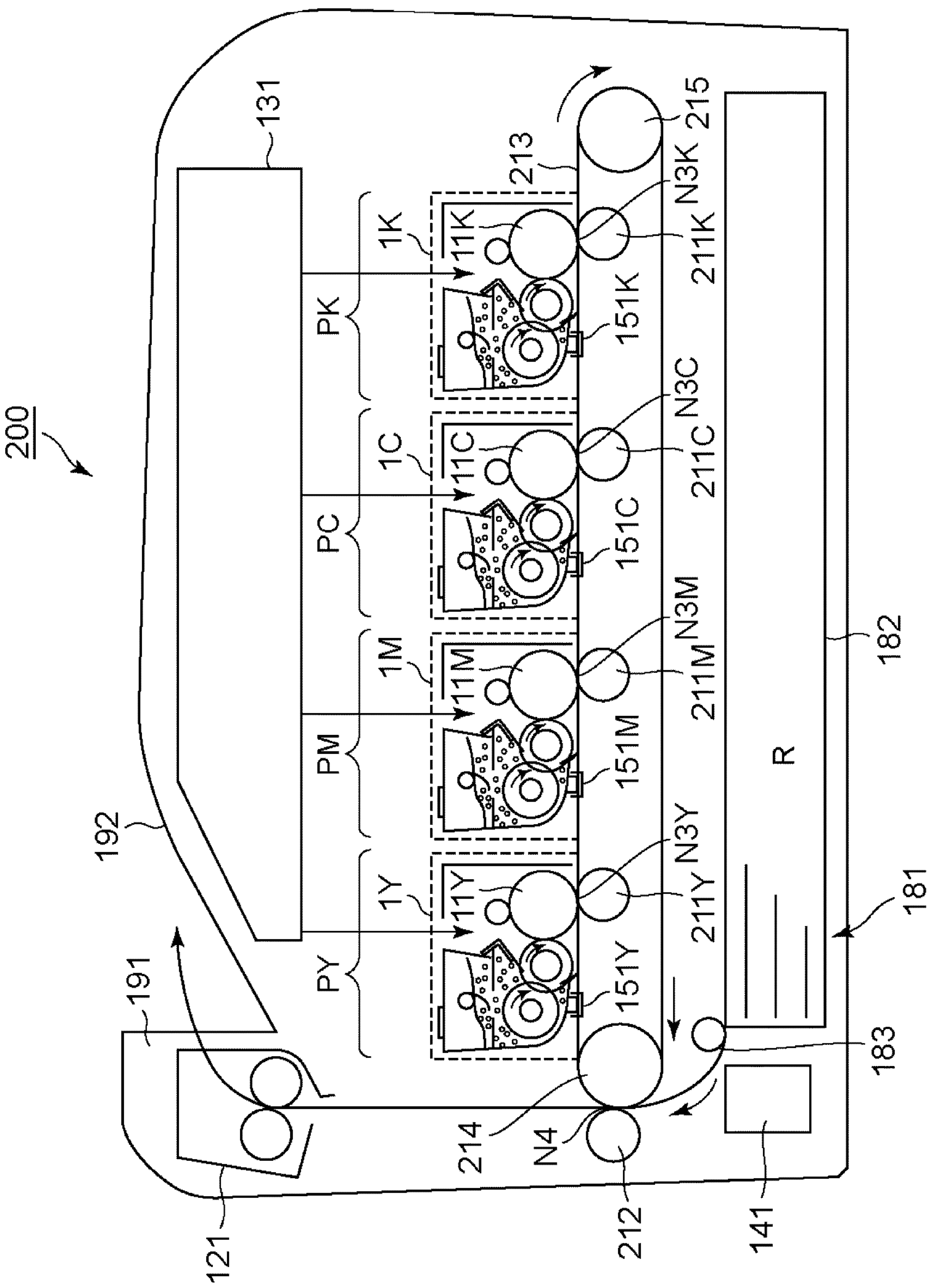
FIG. 11 is a schematic sectional view of an image forming apparatus of an embodiment 2.
Figure 14:
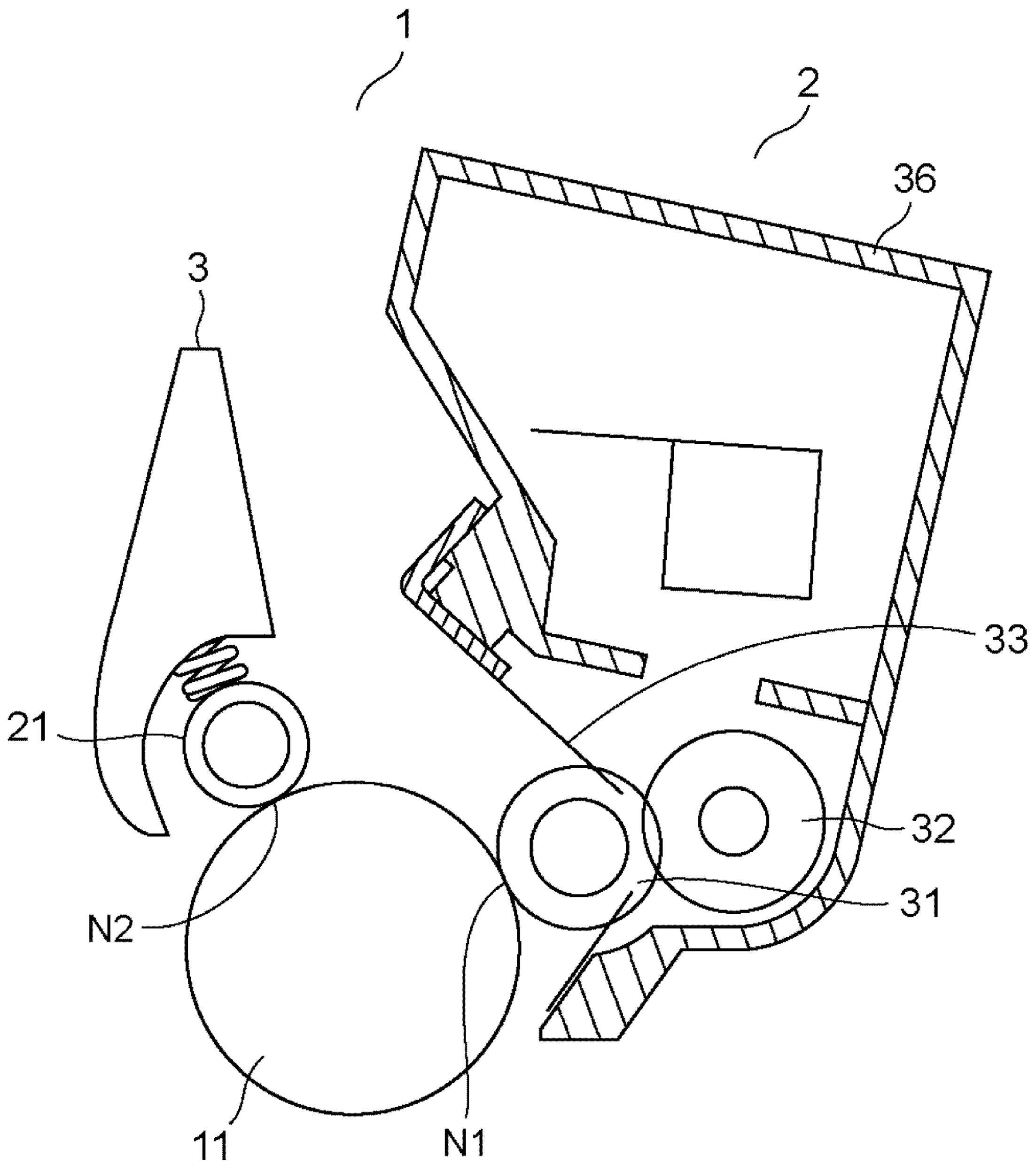
FIG. 14 is a detailed sectional view of the process cartridge of the embodiment 1.

A constitution of this embodiment is a so-called cleaner-less constitution. Due to the cleaner-less constitution, on the photosensitive member 11, there is no cleaning member contacting the photosensitive member 11. Toner (transfer residual toner) remaining on the photosensitive member 11 without being transferred onto the recording material R in the transfer portion N3 is not accommodated in a toner accommodating portion (residual toner accommodating portion) other than the developing unit 2, but is accommodated in the developing device 2 by the developing roller 31 mounted in the developing unit 2. As shown in FIG. 1 and FIG. 11 which are sectional views of the image forming apparatus 100 including the process cartridge 1 and in FIG. 14 showing details of the process cartridge 1, members disposed so as to be contactable to the photosensitive member 11 in an image forming region of the photosensitive member 11 are only the charging roller 21 and the developing roller 31. That is, the surface of the photosensitive member 11 passed through the charging portion N2 which is a contact portion between the photosensitive member 11 and the charging roller 21 passes through the developing portion N1 which is a contact portion between the photosensitive member 11 and the developing roller 31 without contacting any part. That is, outside the image forming apparatus 100, when the photosensitive member 11 is rotated in a state of the process cartridge 1, the surface of the photosensitive member 11 passed through the developing portion N1 passes through the charging portion N2 without particularly contacting any part.

Subsequently, a process in which the transfer residual toner is collected by the developing roller 31 will be described. Of the toner forming the toner image, toner having an electrical charge charged to the opposite polarity (positive charging) and an electrical charge low in absolute value (charge amount close to 0) principally becomes the transfer residual toner. Here, most of the toner of the toner image is charged to the negative polarity which is the normal polarity. The photosensitive member 11 on which the transfer residual toner exists is irradiated with light by a pre-exposure means 6, so that an absolute value of the surface potential formed on the photosensitive member 11 is made small. The photosensitive member 11 is charged to the dark potential by electrical discharge due to a potential difference between the potential formed on the surface of the photosensitive member 11 and the charging voltage applied to the charging roller 21. At this time, the photosensitive member 11 is charged, and in addition, the transfer residual toner is also charged to the negative polarity at the same time. When the transfer residual toner is charged to the negative polarity, in the contact portion N2 between the photosensitive member 11 and the charging roller 21, from a potential relationship thereof, the transfer residual toner passes through the contact portion N2 while remaining on the photosensitive member 11. Thereafter, in the contact portion, between the photosensitive member 11 and the developing roller 31, which is the developing portion N1, by a potential relationship (back contrast) between the developing roller 31 and the dark potential, the transfer residual toner charged to the normal polarity is deposited on the developing roller 31 and is collected by the developing unit 2. In the cleaner-less constitution as in this embodiment, it is important that the transfer residual toner in the transfer portion N3 is made small in amount as can as possible. For that reason, it is important that the electrical charge of the toner used for development falls within an appropriate range, i.e., the toner, for forming the toner image, on the photosensitive member 11 is required that the toner includes the toner charged to the opposite polarity (positive charging) and the toner having an electrical charge close to 0.

Incidentally, in this embodiment, the photosensitive member 11, and as process means acting on the photosensitive member 11, the charging roller 21 and the developing device 2 integrally constitute the process cartridge 1 detachably mountable to the image forming apparatus 100. Further, the transfer roller 111, the exposure device 131, the fixing device 121, the pre-exposure means 6, the controller 141, various power sources, and the like are mounted in the image forming apparatus 100.

2. Process Cartridge

Next, the process cartridge 1 in this embodiment will be further described.

The process cartridge 1 is constituted by including the developing device (developing unit) 2 and the photosensitive member unit 3. The developing device 2 includes, as described later, the developing roller 31, a supplying roller 32, a developing blade 33, and a developing container 36 also functioning as a developer accommodating portion. The developing container 36 also functions as a developing frame for supporting the developing roller 31, the supplying roller 32, and the developing blade 33. The photosensitive member unit 3 includes the photosensitive member 11 and the charging roller 21, and supports each of the photosensitive member 11 and the charging roller 21. Further, the developing device 2 and the photosensitive member unit 3 are connected to each other so that the developing device 2 is swingable relative to the photosensitive member unit 3 about a rotational axis substantially parallel to a rotational axis direction of the photosensitive member 11. More specifically, the developing container (developing frame) 36 of the developing device 2 and a photosensitive member supporting container (photosensitive member unit frame) 61 of the photosensitive member unit 3 are swingably connected to each other, so that the process cartridge 1 is formed by integration. By this, the developing device 2 is capable of being moved to a contact position where the developing roller 31 contacts the photosensitive member 11 and a separation position where the developing roller 31 is separated from the photosensitive member 11. By employing a constitution in which the developing device 2 is movable to the contact position and the separation position, the developing device 2 and the photosensitive member 11 are suppressed from being uselessly consumed. That is, in the separation position, rotations of the developing roller 31 and the supplying roller 32 are stopped by stopping the drive of the developing device 2, so that toner consumption is suppressed, and the photosensitive member 11 is prevented from contacting the developing roller 31, so that abrasion of the charge transport layer is suppressed. The surface movement speed of the developing roller 31 is rotated at a speed which is 1.4 times the surface movement speed of the photosensitive member 11.

Further, in the process cartridge 1, a non-volatile memory 34 as a storing means is mounted. In the non-volatile memory 34, pieces of information such as lifetime information which is information on a lifetime of the process cartridge 1, and toner amount information which is information on a toner amount of the toner in the developing device 2 are stored. Here, as the lifetime information, it is possible to cite a rotation distance of the photosensitive member 1, a rotation distance of the developing roller 31, the number of printed sheets of the recording materials R, and the like. The non-volatile memory 34 is connected to a controller 141 provided in the image forming apparatus 100 when the process cartridge 1 is mounted in the image forming apparatus 100. By this controller 141, reading of the information stored in the non-volatile memory 34, and writing of the information in the non-volatile memory 34 are performed. By this, it is possible to provide appropriate information to the controller 141 when a power source of the image forming apparatus 100 is turned off and when a single process cartridge 1 is used in two or more image forming apparatuses 100.

3. Developing Device

Next, the developing device (developing unit) 2 in this embodiment will be further described.

The developing device 2 includes the developing roller 31 as a developer carrying member (developing member) for carrying and conveying the toner as the developer and for developing the electrostatic latent image by supplying the toner to the electrostatic latent image formed on the surface of the photosensitive member 11. Further, the developing device 2 includes the supplying roller (supplying and peeling-off roller) 32, as a developer supplying member (developer supplying and peeling-off member), for supplying toner to the developing roller 31 and, in addition, for performing peeling-off of the toner from the developing roller 31. Further, the developing device 2 includes the developing blade 33 as a regulating member for regulating the toner supplied to the developing roller 31 to a predetermined toner amount. Further, the developing device 2 includes the developing container 36 forming a toner accommodating portion 37 inside thereof. In the toner accommodating portion 37, the one-component non-magnetic toner as the developer is accommodated.

Each of the developing roller 31 and the supplying roller 32 is rotatably supported by the developing container 36. The supplying roller 32 is disposed so as to contact the surface (outer peripheral surface) of the developing roller 31 at a surface (outer peripheral surface) thereof. The developing roller 31 carries the toner on the surface thereof by being supplied with the toner by the supplying roller 32. The toner carried on the surface of the developing roller 31 is regulated in amount thereof by the developing blade 33, and in addition, is triboelectrically charged, and is conveyed toward the contact portion N1 (developing portion) between the photosensitive member 11 and the developing roller 31. Further, the toner remaining on the surface of the developing roller 31 after passing through the contact portion N1 (developing portion) between the photosensitive member 11 and the developing roller 31 is peeled off from the surface of the developing roller 31 by the supplying roller 32, and is returned to the inside of the toner accommodating portion 37.

In this embodiment, each of the developing roller 31 and the supplying roller 32 is rotationally driven by transmitting thereto a driving force from a driving motor 161 (FIG. 2) for driving the photosensitive member 11. The developing roller 31 is rotationally driven in the arrow A2 direction (counterclockwise direction) in FIG. 1. The rotational direction of the photosensitive member 11 and the rotational direction of the developing roller 31 are opposite directions. That is, the developing roller 31 is rotationally driven in a direction in which the surface movement direction of the photosensitive member 11 and the surface movement direction of the developing roller 31 become a following direction in an opposing portion (contact portion) between the photosensitive member 11 and the developing roller 31. Further, the supplying roller 32 is rotationally driven in an arrow A3 direction (counterclockwise direction) in FIG. 1. The rotational direction of the developing roller 31 and the rotational direction of the supplying roller 32 are the same direction. That is, the supplying roller 32 is rotationally driven in an opposing portion (contact portion) between the developing roller 31 and the supplying roller 32 in a direction in which the surface movement direction of the developing roller 31 and the surface movement direction of the supplying roller 32 become opposite directions. A surface movement speed of the supplying roller is a speed which is 0.83 times the surface movement speed of the developing roller 31.

Figure 15:
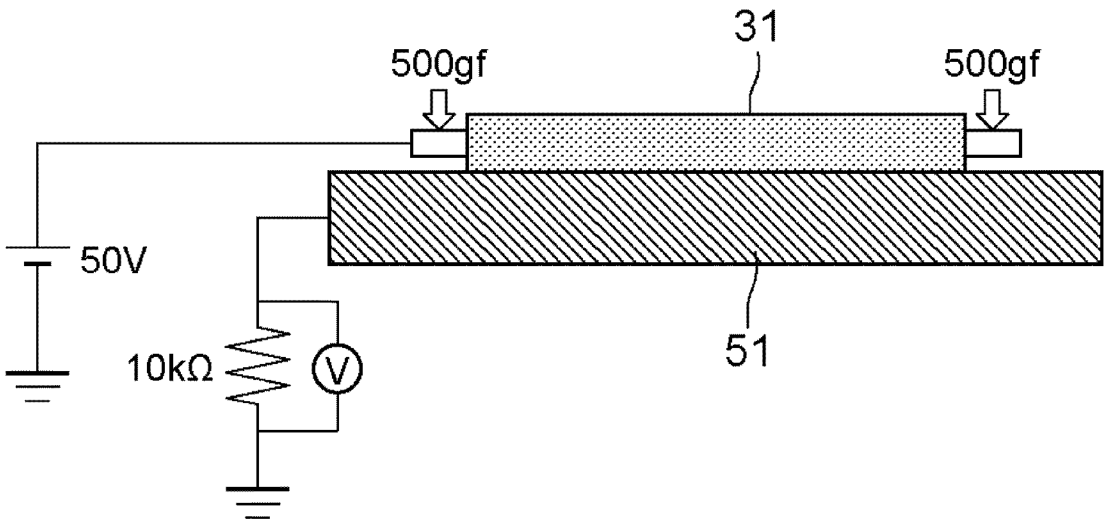
FIG. 15 is a resistance measurement view of a developing roller of the embodiment 1.

In this embodiment, the developing roller 31 is an elastic body roller constituted by providing an electroconductive elastic rubber layer, as an elastic layer, having a predetermined volume resistance at a periphery of a core metal 31*a* made of metal. The developing roller 31 in this embodiment was 1000 μA in current value in the following measuring method. The measuring method of the current cartridge will be described using FIG. 15. In an environment of a temperature of 23° C. and a humidity of 50% RH, in a state in which a mirror surface cylindrical member 51 made of metal in a diameter of 30 mm and a developing roller 31 are contacted over an entire region of the developing roller 31 with respect to a longitudinal direction of the developing roller 31 with a contact load of 500 gf (on each side), the mirror surface cylindrical member 51 made of metal was rotated at a peripheral speed of 1.0 rps. Then, a DC voltage of 50 V is applied to between the core metal of the developing roller 31 and the mirror surface cylindrical member 51 made of metal, and an end-to-end voltage of a resistor of 100Ω connected to the ground side is measured, and a current value of the developing roller 31 is calculated from the measured voltage value. For measurement of the voltage, a voltmeter 40 (manufactured by FLUKE Corporation, 189 TRUE RMS MULTIMETER) was used, and a value calculated from an average in one second from two seconds to three seconds after voltage application was used. The current value of the developing roller 31 in this embodiment may preferably be 100 to 2000 μA. The developing roller 31 comprises a base layer and a surface layer. A silicone rubber is used as the base layer, and an urethane rubber is used as the surface layer. In the urethane rubber as the surface layer, urethane bead particles are dispersed, and a desired roughness is set. The supplying roller 32 is a foam elastic body roller constituted by providing a foam urethane layer, adjusted to a predetermined volume resistivity, as an elastic layer at a periphery of a core metal 32*a* made of metal. In this surface layer which is the foam urethane layer, foam cells open, so that the toner becomes easy to be held and conveyed. Further, in this embodiment, the developing blade 33 is constituted by a plate-like member having flexibility and a developing blade supporting member 33*a* for fixing the plate-like member. In this embodiment, the developing blade 33 is constituted by an elastic plate formed by using SUS (stainless steel) or the like. The developing blade 33 is disposed so that a longitudinal direction thereof is substantially parallel to the rotational axis direction of the developing roller 31. Further, the developing blade 33 is fixed to the developing container 36 at one end portion (fixing end portion) thereof in a short direction thereof. The toner supplied to the developing roller 31 by the supplying roller 32 forms uniform toner coat on the developing roller 31 by being regulated by the developing blade 33. The developing blade 33 is disposed so that a plate surface (a side surface extending along the longitudinal direction of the developing blade 33) close to an end on the other end portion (free end portion) side in a short direction thereof and a surface of the electroconductive elastic rubber layer of the developing roller 31 slide (rub) with each other. For that reason, by the developing blade 33, simultaneously with formation of the toner coat on the developing roller 31, the toner on the developing roller 31 is triboelectrically charged, and an electrical charge is imparted to the toner.

Further, the image forming apparatus 100 is constituted so that potentials (applied develops) of the developing roller 31, the supplying roller 32, and the developing blade 33 can be appropriately set. The voltage applied to the developing roller 31 is set to a voltage such that contrasts (developing contrast, back contrast) to the light potential and the dark potential which are described above become appropriate. Further, the voltage applied to the supplying roller 32 is set to a voltage such that supply of the toner principally to the developing roller 31 is appropriately made. Further, a voltage applied to the developing blade 33 is set to a voltage such that impartment of the electrical charge principally to the toner is appropriately made. For that reason, each of the voltages applied to the supplying roller 32 and the voltage applied to the developing blade 33 is set so as to become appropriate to the voltage applied to the developing roller 31. In this embodiment, the voltage applied to the supplying roller 32 and the voltage applied to the developing blade 33 are the same, and are set so that a potential difference relative to the voltage applied to the developing roller 31 becomes −100 V. Specifically, the voltage applied to the developing roller 31 is −325 V, and the voltage applied to the supplying roller 32 and the voltage applied to the developing blade 33 are −425 V. This is due to use of the negatively chargeable toner in this embodiment. That is, each of the potential of the supplying roller 32 and the potential of the developing blade 33 is set so that a potential difference relative to the potential of the developing roller 31 becomes a potential difference on a negative side. That is, each of the potential of the supplying roller 32 and the potential of the developing blade 33 is set so that a potential difference relative to the potential of the developing roller 31 becomes a potential difference on the negative side. That is, each of the potential of the supplying roller 32 and the potential of the developing blade 33 is set so as to become a potential higher than the potential of the developing roller 31 on the normal charge polarity (in this embodiment, the negative polarity) side of the toner. By this, the toner is urged from the supplying roller 32 toward the developing roller 31, so that the toner can be appropriately supplied to the developing roller 31. Further, by the developing blade 33, to the toner, an electrical charge of the normal charge polarity can be appropriately imparted. Further, the light potential is set to −70 V, and the dark potential is set to −525 V. That is, the potential difference (developing contrast) for the development is 255 V, and the potential difference (back contrast) for non-image formation is 200 V.

Figure 2:
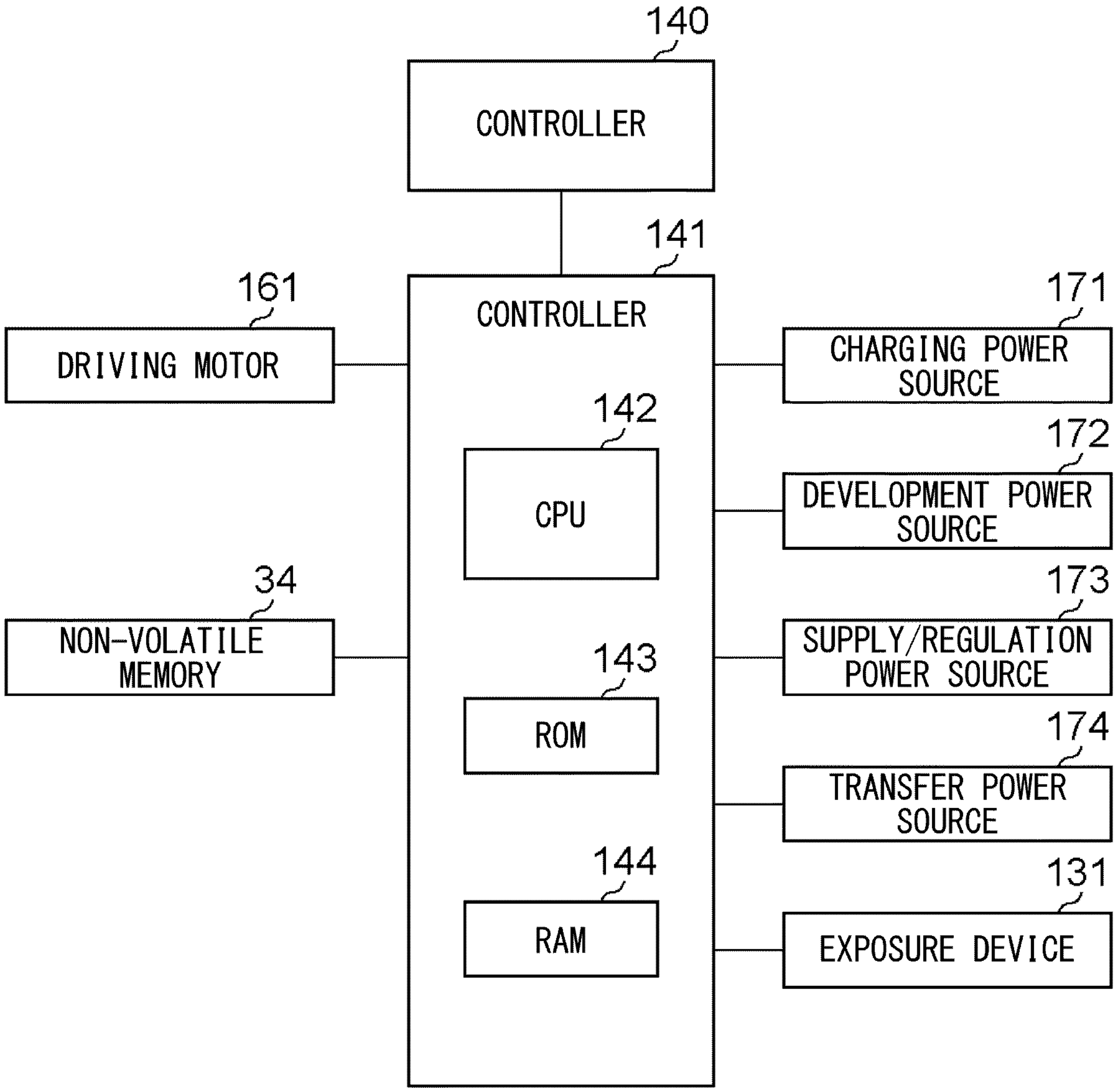
FIG. 2 is a schematic block diagram showing a control mode of the image forming apparatus of the embodiment 1.
Figure 4:
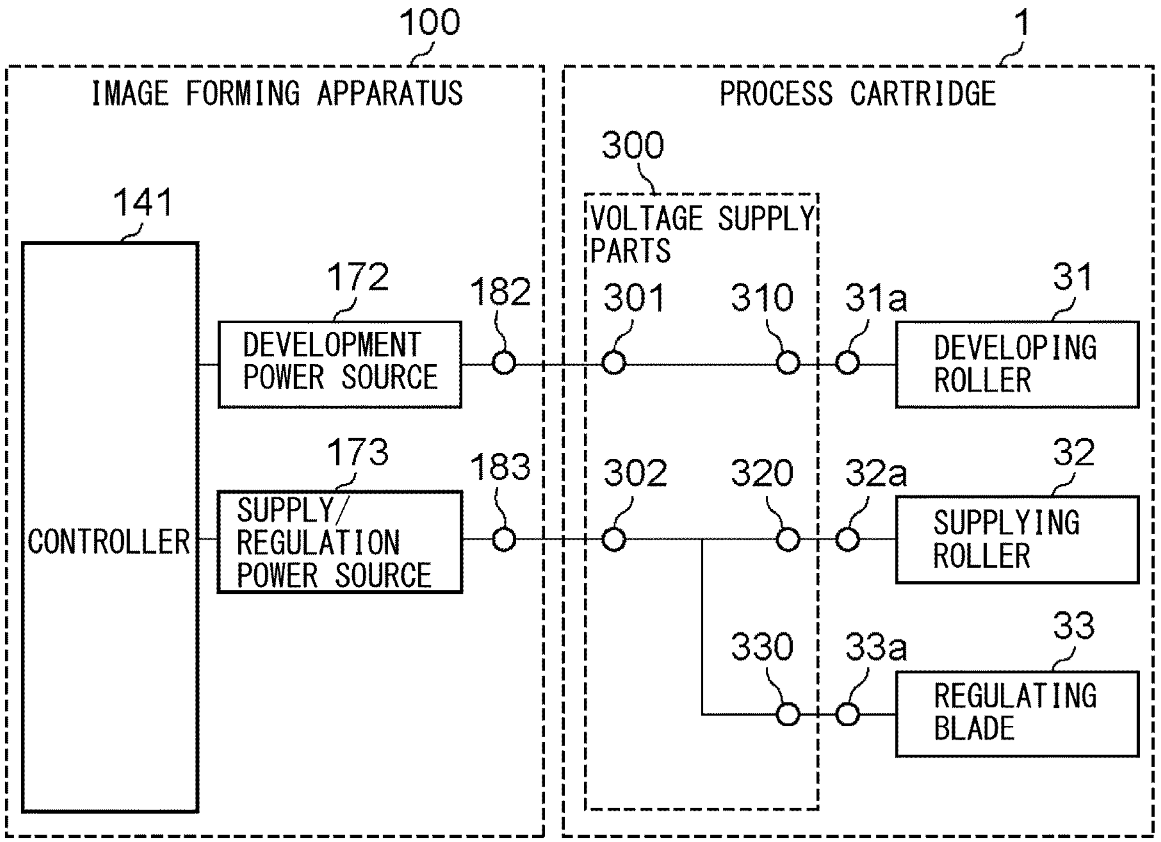
FIG. 4 is a circuit view of voltage supplying from the image forming apparatus to the process cartridge of embodiment 1.

The voltages applied to the developing blade 33 and the supplying roller 32 will be described more specifically using FIG. 3 and FIG. 4. FIG. 3 includes a perspective view of a voltage supplying part 300 (including voltage supply parts) for supplying voltages from a developing voltage main assembly contact 182 and a supply/regulation main assembly contact 183 to the developing roller 31, the supplying roller 32, and the developing blade 33 (part (a) of FIG. 3), a front surface view of the voltage supplying part 300 (part (b) of FIG. 3), and a rear surface view of the voltage supply part 300 (part (c) of FIG. 3). The front surface view is a view of the voltage supplying part 300 as viewed from a side where the voltage supplying part 300 is installed in the image forming apparatus, and the rear surface view is a view of the voltage supplying part 300 as viewed from a side where the voltage supplying part 300 is installed relative to the developing roller 31, the supplying roller 32, and the like. That is, the front surface view is a view of the voltage supplying part 300 as viewed from a side where the developing roller 31 and the like are disposed, and the rear surface view of the voltage supplying part 300 as viewed from a side where the voltage supplying part 300 can be seen in the case where the process cartridge 1 is seen from the outside. FIG. 4 is a circuit view until the voltages are applied from the developing voltage main assembly contact 182 and the supply/regulation voltage main assembly contact 183 of the image forming apparatus 100 to the developing roller 31, the supplying roller 32, and the regulating blade 33 of the process cartridge 1. The voltage supplying part 300 includes a developing voltage contact 301 contacting the developing power source main assembly contact 182 provided in the image forming apparatus 100 and a supply/regulation voltage contact 302 contacting the supply/regulation voltage contact 183. A conduction path 311 is formed of an electroconductive resin so as to electrically conduct the developing voltage contact 301 and a developing roller holding portion 310 for holding a shaft 31*a* of the developing roller 31 (black marked portions of parts (a), (b), and (c) of FIG. 3). Similarly, a conduction path 321 for electrically conducting from the supply/regulation voltage contact 302 to a supplying roller holding portion 320 for holding a shaft 32*a* of the supplying roller 32 and a regulating blade contact 330 contacting the regulating blade 33 ((cross-) hatched portions of parts (a), (b), and (c) of FIG. 3). The electroconductive resin 311 from the developing voltage contact 301 to the developing roller holding portion 310 and the electroconductive resin 321 from the supply/regulation voltage contact 302 to the supplying roller holding portion 320 and the regulating blade contact 330 and formed independently. For that reason, independent voltages can be applied (see the circuit view of FIG. 4). As described above, the power source for supplying voltages from the image forming apparatus 100 to the supplying roller 32 and the developing blade 33 is one, and is a supply/regulation power source 173 (FIG. 2). When the supply/regulation main assembly contact 183 of the supply/regulation power source 173 provided in the image forming apparatus 100 and the supply/regulation voltage contact 302 of the voltage supplying part 300 attached to the developing unit 2 contact each other, an output voltage of the main assembly of the image forming apparatus 100 becomes possible to be supplied to the developing unit 2. The process cartridge 1 is mounted in the image forming apparatus 100, whereby the supply/regulation voltage contact 302 is connected to the supply/regulation main assembly contact 183, so that the voltage from the supply/regulation power source 173 is supplied. Similarly, the developing voltage main assembly contact 182 of the development power source 172 provided in the image forming apparatus 100 and the developing voltage contact 301 of the voltage supplying part 300 attached to the developing unit 2 contact each other, so that the output voltage of the main assembly of the image forming apparatus 100 becomes possible to be supplied to the developing unit 2. The process cartridge 1 is mounted in the image forming apparatus 100, whereby the developing voltage contact 301 is connected to the developing voltage main assembly contact 182, so that the voltage from the development power source 172 is supplied. As described above, the voltage from the same power source is branched, so that the same voltage can be applied to the developing blade 33 and the supplying roller 32. In the case where the power source for supplying the voltage to the supplying roller 32 and the power source for supplying the voltage to the developing blade 33 are different, even when the supplied voltages are made the same voltage, due to an individual difference between the power sources, strictly, the supplied voltages are different from each other. For that reason, it is difficult that the potentials of the supplying roller 32 and the developing blade 33 are made the same. In general, in the case where an inexpensive power source is used, a variation in voltage due to the individual difference of this power source becomes large. Therefore, the developing unit 2 is caused to have the above-described voltage application constitution, so that voltages with no potential difference can be supplied, with an inexpensive constitution, to the developing blade 33 and the supplying roller 32 even for the individual difference between the power sources of the image forming apparatus 100. In this embodiment, voltage supply from the image forming apparatus 100 to the process cartridge 1 is made by using, as the conduction path, the electroconductive resin provided in the voltage supplying part 300. The voltage supply is not necessarily made by the electroconductive resin, and the electroconductive resin may be replaced with metal, or a part of the electroconductive resin may be replaced with metal.

Thus, during the development, to the developing roller 31, the predetermined developing voltage (developing bias) is applied at the predetermined timing from the development power source 172 (FIG. 2) as the developing voltage applying means (developing voltage applying portion). In this embodiment, to the developing roller 31, as the developing voltage, the DC voltage of the negative polarity is applied. Further, during the development, to the developing blade 33 and the supplying roller 32, a predetermined voltage (supply/regulation bias) is applied at a predetermined timing from the supply/regulation power source 173 (FIG. 2) as a supply/regulation voltage applying means (supply/regulation voltage applying portion. In this embodiment, to the developing blade 33 and the supplying roller 32, as the supply/regulation voltage, a DC voltage higher than the developing voltage on the normal charge polarity (in this embodiment, the negative polarity) of the toner is applied.

4. Toner

<Toner Constitution>

Next, the toner in this embodiment will be further described.

In the following, description of "XX or more and YY or less" and "XX to YY" which represent numerical ranges mean numerical ranges each including a lower limit and an upper limit which are end points. In the case where the numerical ranges are described stepwise, the upper limits and the lower limits of the respective numerical ranges can be combined arbitrarily. "(meth)acrylic" means "acrylic" and/or "methacrylic".

The toner in this embodiment is toner containing toner particles containing a binder resin, and hydrotalcite particles. The hydrotalcite particles are readily charged to the positive polarity, and are capable of acting as a microcarrier for charging the toner particles to the negative polarity. In addition, the hydrotalcite particles of the toner in this embodiment contain fluorine. The hydrotalcite particles are particles high in charging property to the positive polarity, and therefore, have a strong positive polarity. The fluorine is contained in the hydrotalcite particles, so that the charging property of the hydrotalcite particles and a polarity of the hydrotalcite particles can be adjusted. The fluorine is contained in the hydrotalcite particles, so that it is possible to suppress that the hydrotalcite particles are charged to the strong positive polarity, and therefore, it is possible to suppress that the toner has a strong negative polarity. As an example, toner in which hydrotalcite not containing the fluorine is externally added to toner particles (toner 2 described later), toner in which hydrotalcite containing the fluorine is externally added to the same toner particles (toner 1 described later), and toner in which hydrotalcite is not externally added to the same toner particles irrespective of presence or absence of the fluorine (in the toner 2 described later, the hydrotalcite is not externally added to the toner particles) were prepared, and a charge amount distribution of the toner was measured. By using the image forming apparatus 100 and the process cartridge 1 in this embodiment, solid (solid white) image formation is carried out on one sheet, and therefore toner on the developing roller 31 is collected. A toner collection position on the developing roller 31 is a position downstream of a contact position of the developing blade 33 and upstream of the developing portion N1 with respect to the rotational direction of the developing roller 31, and the toner in this position was collected and the charge amount of the collected toner was measured. Measurement of the charge amount was made using E-Spart Analyzer manufactured by Hosokawa Micron Corporation.

First, a number percentage of toner of which charge amount Q/M per unit weight is the positive polarity was compared. It was able to be confirmed that compared with the toner to which the hydrotalcite is not externally added, the toner to which the hydrotalcite not containing the fluorine is externally added is decreased in number percentage of the toner of the positive polarity by 16%, and the toner to which the hydrotalcite containing the fluorine is externally added is decreased in number percentage of the toner of the positive polarity by about 22%. That is, this result is the action exhibited by the hydrotalcite as the microcarrier for negatively charging the toner.

Next, as toner of a strong negative polarity, toner of which charge amount Q/M per unit weight is −30 [μC/g] or more (evaluated by an absolute value) was compared in number percentage thereof. Then, it was able to be confirmed that compared with the toner to which the hydrotalcite not containing the fluorine is externally added, the toner to which the hydrotalcite containing the fluorine is externally added is decreased in number percentage of the toner of the strong negative polarity by about 39%. That is, a presence percentage of the toner of the strong negative polarity is lowered by using such toner, so that it is possible to suppress an increase in necessary developing contrast. Therefore, a fog can be suppressed by decreasing the toner charged to the positive polarity as can as possible while suppressing that a development density becomes thin.

Further, as the toner of a weak negative polarity, toner of which charge amount Q/M per unit weight is −0.75 to −2.25 (evaluated as the absolute value) was compared in number percentage thereof. It was able to be confirmed that compared with the toner to which the hydrotalcite not containing the fluorine is externally added, the toner to which the hydrotalcite containing the fluorine is externally added in increased in number percentage of the toner of the weak negative polarity by about 10%. Although the toner to which the hydrotalcite constituting the fluorine is externally added decreases the toner of the positive polarity, for example, in the case where the toner charge amount is changed toward the positive polarity side by external disturbance such that a balance of electrical charge supply is lost, the charge amount is liable to become 0 or the positive polarity.

As an example, the toner in which the hydrotalcite not containing the fluorine is contained in the toner particles and the toner in which the hydrotalcite constituting the fluorine is contained in the same toner particles were prepared, and measurement of a toner charge amount distribution was made. By using the image forming apparatus 100 and the process cartridge 1 in this embodiment, solid (solid white) image formation is carried out on one sheet, and thereafter, toner on the developing roller 31 is collected. The charge amount of the collected toner was measured. Measurement of the charge amount was made using E-Spart Analyzer manufactured by Hosokawa Micron Corporation. As toner of a strong negative polarity, toner of which charge amount Q/M per unit weight is −25 [μC/g] or more (evaluated by an absolute value) was compared in number percentage thereof. Then, it was able to be confirmed that compared with the toner to which the hydrotalcite not containing the fluorine is externally added, the toner to which the hydrotalcite containing the fluorine is externally added is decreased in number percentage of the toner of the strong negative polarity by about 23%. That is, a presence percentage of the toner of the strong negative polarity is lowered by using such toner, so that it is possible to suppress an increase in necessary developing contrast. Therefore, a fog can be suppressed by decreasing the toner charged to the positive polarity as can as possible while suppressing that a development density becomes thin.

The hydrotalcite particles used in this embodiment will be described in detail. The hydrotalcite particles contain the fluorine. Here, the presence or absence of the fluorine in the hydrotalcite particles can be confirmed by STEM-EDS mapping analysis. As regards an analyzing condition and the like, a method described later is employed. Further, in line analysis in the STEM-EDS mapping analysis, the fluorine exists inside the hydrotalcite particles. Specifically, this means that EDP line analysis is performed for an outer periphery of the hydrotalcite particles containing the fluorine with respect to a normal direction and the fluorine existing inside the particles is detected. Detection of the fluorine inside the hydrotalcite particles by the above-described analysis is represents that the fluorine is intercalated between layers of the hydrotalcite particles. By the existence (presence) of the fluorine inside the hydrotalcite particles, the hydrotalcite particles are not excessively charged to the positive polarity, and can maintain an appropriate charge amount of the positive polarity. The reason why the hydrotalcite particles can maintain the appropriate charge amount of the positive polarity is because the fluorine strong in negative polarity exists inside the hydrotalcite particles, and positive polarity-electrical charges on surfaces of the hydrotalcite particles can be neutralized by being taken inside the particles. That is, it is predicted that excessive charging of particle surfaces to the positive polarity can be suppressed.

Incidentally, introduction of the fluorine into the hydrotalcite particles may preferably be introduction (intercalation) of fluoride ions into between the hydrotalcite particles by an ion exchange.

A value of a ratio F/Al (elemental ratio), of an atom number concentration of the fluorine to an atom number concentration of aluminum in the hydrotalcite particles, obtained from a main component mapping of the hydrotalcite particles by STEM-EDS mapping analysis of the toner may preferably be 0.01 to 0.65. Further, the F/Al value may more preferably be 0.02 to 0.60.

Specifically, by the F/Al being 0.01 or more, a surface charge distribution of the hydrotalcite particles can be uniformized, so that charge stability of the toner becomes good.

Further, by the F/Al being 0.65 or less, excessive neutralization of the surface electrical charges of the hydrotalcite particles is suppressed, and time stability of positive electrical charges is enhanced, so that the charge stability of the toner becomes good. As a result, it is possible to suppress that the electrical charge of the toner becomes a strong negative polarity.

The atom number concentration of the fluorine in the hydrotalcite particles is not particularly limited, but an atom number of the fluorine to an atom number of all elements detected by the STEM-EDS mapping analysis in the hydrotalcite particles may preferably be 0.01 atom % to 5.00 atom %, more preferably be 0.04 atom % to 3.00 atom %, further preferably be 0.09 atom % to 2.00 atom %. In this range, a positive property of the hydrotalcite particles becomes appropriate and a microcarrier characteristic falls within an appropriate range.

As the hydrotalcite particles, hydrotalcite particles represented by the following composition formula (1) can be used. Incidentally, in the composition formula (1), M and A are represented by ion states.

$$M^{2+}_{y}M^{3+}_{x}(OH)_2A^{n-}_{(x/n)}\cdot mH_2O \quad (1)$$

The $M^{2+}$ and $M^{3+}$ represent divalent cation and trivalent cation, respectively, of metal.

The hydrotalcite particles may be a solid solution containing a plurality of different elements. Further, the hydrotalcite particles may contain monovalent metal in a very small amount.

However, it is preferable that $0<x\leq 0.5$, $y=1-x$, and $m\geq 0$.

$M^{2+}$ may preferably be the divalent cation of at least one metal selected from the group consisting of Mg, Zn, Ca, Ba, Ni, Sr, Cu, and Fe.

$M^{3+}$ may preferably be the trivalent cation of at least one metal selected from the group consisting of Al, B, Ga, Fe, Co, and In.

$A^{n-}$ is n-valent anion and at least contains $F^-A^{n-}$ may contain, outside of $F^-$, $CO_3^{2-}$, $OH^-$, $Cl^-$, $I^-$, $Br^-$, $SO_4^{2-}$, $HCO_3^-$, $CH_3COO^-$, and $NO_3^-$ and the like, and may contain a plurality of different anions.

As the metal becoming the above-described divalent cation, the metal may preferably be Mg (magnesium), and as the metal becoming the above-described trivalent cation, the metal may preferably be Al (aluminum). The hydrotalcite particles may preferably contain the aluminum becoming the trivalent cation and the magnesium becoming the divalent cation.

As a specific composition formula, it is possible to cite $$Mg^{2+}_{8.6}Al^{3+}_{4}(OH)_{25.2}F^-_{2}CO_3^{2-}\cdot mH_2O,$$

$Mg^{2+}{}_{12}Al^{3+}{}_{4}(OH)_{32}F^{-}{}_{2}CO_3{}^{2-}\cdot mH_2O$, and the like.

In the case where the hydrotalcite particles contain the aluminum becoming the trivalent cation and the magnesium becoming the divalent cation, a value of a ratio (Mg/Al) of an atom number concentration (atom %) of magnesium to an atom number concentration (atom %) of aluminum may preferably be 1.50 to 4.00.

Further, the hydrotalcite particles may preferably contain water in molecule thereof, and in the formula (1), $0.1<m<0.6$ may more preferably hold.

A number-average particle diameter (size) H3 of primary particles of the hydrotalcite particles may preferably be 40 nm to 1100 nm, and may more preferably be 60 nm to 1000 nm.

The number-average particle diameter of the hydrotalcite particles falls within the above-described range, so that a charge rising property of the toner becomes good.

The above-described particle diameter can be measured using a well-known means such as a scanning electron microscope. Further, the above-described particle diameter can be controlled by controlling conditions of a reaction step, a pulverizing step, a centrifugal separation step, classifying step, and sieving step in a manufacturing step of the hydrotalcite particles.

The hydrotalcite particles may be subjected to hydrophobic treatment by a surface treatment agent. As the surface treatment agent, oils such as higher fatty acids, coupling agents, esters, and silicone oil are usable. Among these, the higher fatty acids may preferably be used, and specifically, stearic acid, oleic acid, and lauric acid are exemplified.

A content of the hydrotalcite particles in the toner is not particularly limited. Per 100 weight parts by mass of toner particles, the content of the hydrotalcite particles may preferably be 0.01 weight part by mass to 3.00 parts by mass, may more preferably be 0.05 part by mass to 0.50 part by mass, and may further preferably be 0.05 part by mass to 0.30 part by mass. The content of the hydrotalcite particles can be quantified by using a calibration curve prepared from a standard sample with use of fluorescent X-ray analysis.

A sticking ratio of the above-described hydrotalcite particles to the toner particles may preferably be 10% to 95%. The sticking ratio may preferably be 40% to 95%, and may further preferably be 50% to 70%. When the sticking ratio is in the above-described ranges, the above-described effect is readily obtained. The above-described sticking ratio is controllable by changing an external addition condition by a well-known external addition method.

An areal ratio, of the hydrotalcite particles to the toner particles, measured by the STEM-EDS mapping analysis and occupying in an EDS measuring visual field may preferably be 0.07% to 0.54%. The areal ratio may more preferably be 0.25% to 0.50%, and may further preferably be 0.35% to 0.45%. When the areal ratio is in the above-described ranges, the above-described effect is readily obtained. The above-described areal ratio can be controlled by changing an input amount of the above-described hydrotalcite particles.

<Manufacturing Method of Toner Particles>

A manufacturing method of the toner particles is not particularly limited, and can use a well-known means and can use a kneading and pulverizing method or a wet manufacturing method. The wet manufacturing method is preferable from viewpoints of uniformization of the particle diameter, a shape control property, and ease of obtainment of the toner particles having a core-shell structure. As the wet manufacturing method, it is possible to cite a suspension polymerization method, a dissolution suspension method, an emulsion aggregation method, and the like.

<Toner Manufacturing Method>

The toner contains the hydrotalcite particles as an external additive. As needed, another external additive may be added. In this case, a content of the external additive such as inorganic and organic fine particles including the hydrotalcite particles may preferably be 0.50 part by mass to 5.00 parts by mass in total per 100 parts by mass of the toner particles.

As a mixing machine for externally adding the external additive to the toner particles, the mixing machine is not particularly limited, and a well-known mixing machine can be used irrespective of a dry type and a met type. For example, it is possible to cite FM mixer (manufactured by NIPPON COKE & ENGINEERING CO., LTD.), Mitsui Henschel mixer (manufactured by Mitsui Miike Kakoki Co., Ltd.), Super Mixer (manufactured by KAWATA MFG. CO., LTD.), Nobilta (manufactured by Hosokawa Micron Corporation), Hybridizer (manufactured by Nara Machinery), and the like. In order to control a coating state of the external additive, by adjusting a number of rotation, a treatment time, a water temperature/water amount of a jacket of the above-described external addition machine, the toner can be prepared.

Hereinafter, measuring methods of physical properties of the toner and respective materials will be described.

<Identifying Method of Hydrotalcite Particles>

Identification of the hydrotalcite particles can be performed by combining shape observation by a scanning electron microscope (SEM) and element analysis by energy dispersive X-ray spectroscopy (EDS).

By using a scanning electron microscope "S-4800" (trade name; manufactured by Hitachi, Ltd.), the toner is observed in a visual field enlarged to 50,000 times at maximum. An external additive which is discrimination object is observed by focusing on a toner particle surface. By performing the EDS analysis of the external additive which is the discrimination object, identification of the hydrotalcite particles can be performed from a kind of element peaks.

As the element peak, in the case where the element peak of the at least one metal selected from the group consisting of Mg, Zn, Ca, Ba, Ni, Sr, Cu, and Fe, and the element peak of at least one metal selected from the group consisting of Al, B, Ga, Fe, Co, and In are observed, existence of the hydrotalcite particles containing the above-described two kind of metal can be analogized.

A standard sample of the hydrotalcite particles analogized by the EDS analysis is separately prepared, and the shape observation by the SEM and the EDS analysis are performed. Whether or not analysis result of the standard sample coincides with an analysis result of the particles which are the discrimination object is compared, so that whether or not the particles are the hydrotalcite particles.

<Measuring Method of Each Element Ratio in Hydrotalcite Particles>

Measurement of each element ratio in the hydrotalcite particles is conducted by EDS mapping measurement of the toner with use of a scanning transmission electron microscope (STEM). In the EDS mapping measurement, spectral data is possessed for each picture element (pixel) of an analysis area. By using a silicon drift detector having a large detecting element area, EDS mapping can be measured with high sensitivity.

Statistical analysis is performed for the spectral data of each pixel obtained by the EDS mapping measurement, so that main component mapping extracting pixels having similar spectrum can be obtained, and it becomes possible to perform mapping in which components are identified.

Preparation of a sample for observation is performed in the following manner.

0.5 g of toner is weighed and is left at rest for 2 minutes under a load of 40 kN by using Newtonpress, and a columnar toner pellet of 8 mm in diameter and about 1 mm in thickness is prepared by a columnar mold of 8 mm in diameter. A thin piece of 200 nm in thickness is prepared from the toner pellet by an ultramicrotome (Leica Microsystems, FC7).

The STEM-EDS analysis is performed by the following apparatus and condition.

Scanning transmission electron microscope; manufactured by JEOL Ltd. JEM-2800

EDS detector; JEOL Ltd. JED-2300T Dry SD100GV detector (detecting element area: 100 $mm^2$)

EDS analyzer; manufactured by Thermo Fischer Scientific Inc. NORAN System 7

[Condition of STEM-EDS]

Acceleration voltage of STEM: 200 kV

Magnification: 20,000

Probe size: 1 nm

STEM image size, 1024×1024 pixel (EDS element mapping image in same position is acquired).

EDS mapping size; 256×256 pixel, Dwell Time; 30 μs, Integration times; 100 frames Calculation of each element ratio in the hydrotalcite particles based on multivariable analysis is made in the following manner.

By the above-described STEM-EDS analyzing apparatus, the EDS mapping is obtained. Then, collected spectrum mapping data is subjected to the multivariable analysis by using a COMPASS (PCA) mode in measurement command of the above-described NORMAN System 7, so that the main component map image is extracted.

At that time, set values were as follows.

Kernel size: 3×3

Quantitative map setting: High (slow)

Filter fit type: High accuracy (slow)

At the same time, by this operation, an area ratio occupying an EDS visual field of each main component extracted is calculated. Quantitative analysis is carried out by Cliff-Lorimer method for EDS spectrum possessed by the resultant each main component mapping.

Discrimination between the toner particle portion and the hydrotalcite particles is performed based on a result of the above-described quantitative analysis of the resultant STEM-EDS main component mapping. The corresponding particles can be identified as the hydrotalcite particles from a particle size, a shape, a content of multi-valent metal such as aluminum and magnesium, and an amount ratio thereof.

<Analyzing Method of Fluorine and Aluminum of Hydrotalcite Particles>

On the basis of mapping data by the STEM-EDS, mapping analysis obtained by the above-described method, analysis of fluorine and aluminum of the hydrotalcite particles is performed. Specifically, the EDS line analysis is performed with respect to a normal direction to an outer periphery of the hydrotalcite particles, so that analysis of the fluorine and the aluminum which exist inside the particles is performed.

Figure 5:
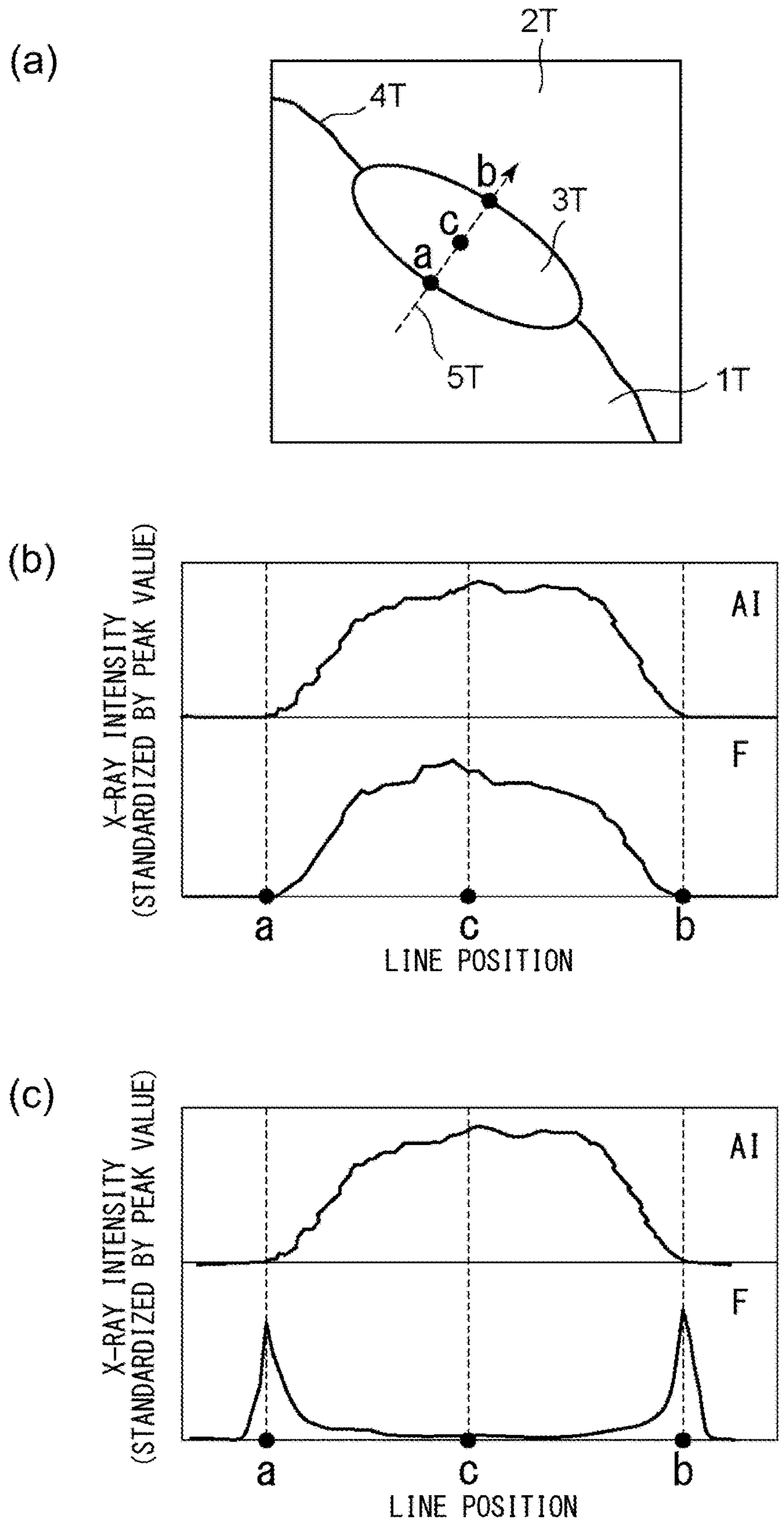
FIG. 5 includes schematic views of line analysis of an external additive of the embodiment 1.

A schematic view of the line analysis is shown in part (a) of FIG. 5. In a hydrotalcite particle 3T adjacent to a toner particle 1T and a toner particle 2T, the line analysis is performed with respect to the normal direction to the outer periphery of the hydrotalcite particle 3T, i.e., a direction of 5T. Incidentally, 4T represents a boundary of the toner particles.

A hydrotalcite particle existing range in the obtained STEM image is selected by a rectangle selection tool, and is subjected to the line analysis in the following condition.

Line Analysis Condition

STEM magnification; 800,000

Line length; 200 nm

Line width; 30 nm

Line division number; 100 points (intensity measurement every 2 nm)

A criterion for discriminating that an associated element is contained inside the hydrotalcite particle is as follows. The case where in the EDS spectrum of the hydrotalcite particle, element peak intensity of the fluorine or the aluminum is present 1.5 times background intensity. The case where the element peak intensity of the fluorine or the aluminum in both end portions (point a and point b of part (a) of FIG. 5) of the hydrotalcite particle in the line analysis does not exceed 3.0 times the peak intensity in a point c. The case where both the above-described cases are satisfied is discriminated that the associated element is contained inside the hydrotalcite particle. Incidentally, the point c is a middle point of a line segment ab (i.e., a middle point of the above-described both end portions).

Examples of X-ray intensities of the fluorine and the aluminum obtained in the line analysis are shown in part (b) of FIG. 5 and part (c) of FIG. 5. In the case where the hydrotalcite particle contains the fluorine and the aluminum inside thereof, a graph of the X-ray intensities standardized by peak intensities shows shapes as in part (b) of FIG. 5. In the case where the hydrotalcite particle contains the fluorine derived from a surface treatment agent, a graph of the X-ray intensities standardized by peak intensities has peaks in the neighborhoods of the points a and b in the both end portions in the graph of the fluorine. By checking the X-ray intensities derived from the fluorine and the aluminum in the line analysis, it is possible to confirm that the hydrotalcite particle contains the fluorine and the aluminum inside thereof.

<Calculating Method of Value of Ratio (Element Ratio) F/Al of Atom Number Concentration of Fluorine to Atom Number Concentration of Aluminum in Hydrotalcite Particles>

A value of a ratio (element ratio) F/Al of atom number concentrations of the fluorine and the aluminum in the hydrotalcite particles, obtained from the main component mapping derived from the hydrotalcite particles by the above-described STEM-EDS mapping analysis is acquired in a plurality of visual fields. Then, an arithmetic mean is taken for 100 or more associated particles, and is used as the value of the ratio (element ratio) F/Al of the atom number concentration of the fluorine to the atom number concentration of the aluminum in the hydrotalcite particles.

<Calculating Method of Value of Ratio (Element Ratio) Mg/Al of Atom Number Concentration of Magnesium to Atom Number Concentration of Aluminum in Hydrotalcite Particles>

By a method similar to the above-described calculating method of the ratio (element ratio) F/Al of the atom number concentration of the Fe to the atom number concentration of the aluminum in the hydrotalcite particles, the calculation is performed for the magnesium and the aluminum. Then, the ratio (element ratio) Mg/Al of the atom number concentration of the magnesium to the atom number concentration of the aluminum of the hydrotalcite particle is calculated.

<Calculating Method of Atom Number Concentration of Fluorine in Hydrotalcite Particles>

On the basis of the mapping data by the STEM-EDS mapping analysis obtained by the above-described method, the atom number concentration of the fluorine in the hydrotalcite particles is calculated. In the main component map image of the hydrotalcite particles extracted by the above-described method, the atom number concentration (element amount) of the fluorine in the hydrotalcite particles is quantified.

The above-described mapping data is obtained in a plurality of visual fields, and an arithmetic mean for 100 or more hydrotalcite particles is used as the atom number concentration of the fluorine in the hydrotalcite particles.

<Measuring Method of Number-Average Particle Diameter of Primary Particles of Hydrotalcite Particles>

Measurement of a number-average particle diameter S3 of primary particles of the number-average particle diameter of the primary particles of the hydrotalcite particles is performed by combining the scanning electron microscope "S-4800" (trade name; manufactured by Hitachi, Ltd.) and element analysis by the energy dispersive X-ray spectroscopy (EDS). By observing the toner to which the hydrotalcite particles are externally added as the external additive, in a visual field enlarged to 200,000 times at the maximum, the hydrotalcite particles are photographed. From a photographed image, the hydrotalcite particles are selected, a major diameter of the primary particle of the hydrotalcite particle is measured randomly for 100 particles, so that the number-average particle diameter of the hydrotalcite particles is obtained. An observation magnification is appropriately adjusted by a size of the external additive.

<Measuring Method of Sticking Ratio of Hydrotalcite Particles to Toner Particles>

First, 2 kinds of samples (toner before water washing, toner after water washing) are prepared.

(i) Toner before water washing: Various kinds of toner prepared in embodiments described later are used as they are.

(ii) Toner after water washing: In 100 mL of ion exchange water, 160 g of sucrose (manufactured by Kishida Chemical Co., Ltd.) is added and is dissolved while being subjected to heating in hot water, so that a sucrose concentrated solution is prepared. In a tube for centrifugal separation, 31 g of the above-described sucrose concentrated solution and 6 mL of Contamiron N (10 mass % aqueous solution of neutral detergent for washing precision measuring apparatus of pH7 comprising nonionic surfactant, anionic surfactant, and organic builder, manufactured by Wako Pure Chemicals Industries, Ltd.) are put, so that a dispersion liquid is prepared. In this dispersion liquid, 1 g of the toner is added, and a lump of the toner is loosened by a spatula or the like. The tube for the centrifugal separation is shaker by a shaker at $5.8\ s^{-1}$ for 20 min.

After the shaking, the solution is changed in tube from the tube for centrifugal separation to a glass tube for a swing rotor (50 mL), and the centrifugal separation is performed by a centrifugal separator under a condition of $58.3\ s^{-1}$ and 30 min. Sufficient separation of the toner and the solution is visually confirmed, and the toner separated in an uppermost layer is collected by a spatula or the like. An aqueous solution containing the collected toner is filtered by a vacuum filter, and then, is dried for 1 hour or more, so that a sample is prepared.

These samples before and after water washing are subjected to SEM/EDS observation in a visual field in which 20 particles of the toner selected randomly under the following condition, and the sum of areas of the hydrotalcite particles is calculated. By the following formula, the sticking ratio of the hydrotalcite particles is calculated.

$$\text{Sticking particle of hydrotalcite particles (\%)} = (\text{Sum of area of hydrotalcite particles to toner after water washing})/(\text{Sum of area of hydrotalcite particles to toner before water washing}) \times 100$$

An apparatus and an observation condition of SEM/EDS are as follows. Use apparatus (SEM): manufactured by Carl Zeiss Microscope Co., Ltd. Ultra PLUS Use apparatus (EDS): manufactured by Thermo Fisher Scientific Inc. NORAN System 7, Ultra Dry EDS Detector Accelerated voltage: 5 kV WD: 7.0 mm Aperture Size: 30.0 μm Detected signal: SE2 (secondary electron)

Observation magnification: 50,000 times

Mode: Spectral Imaging

Pre-treatment: sample toner is dispersed on carbon tape and is sputtered with platinum.

In the following, the present disclosure will be further described in detail by citing embodiments and a comparison example, but the present disclosure is not restricted to this. "Part(s)" used in the embodiment is on a mass basis unless otherwise specifically noted.

In the following, toner manufacturing examples will be described.

<Manufacturing Example of Toner Particles>

<Preparation of Acquires Dispersion Medium>

Water 390.0 parts

Sodium Phosphate 4.2 parts

The above-described aqueous solution was prepared and was held at 60° C., so that sodium phosphate was prepared. Next, Water 17.1 parts Calcium chloride 2.4 parts The above-described aqueous solution was prepared, and then was added to the above-described sodium phosphate aqueous solution, and was stirred at a high speed, so that an aqueous dispersion medium containing calcium phosphate fine particles was prepared.

<Preparation of Polymerizable Monomer Composition 1>

Styrene 30.0 parts

C.I. Pigment blue 15:3 6.0 parts

Charge control agent (aluminum complex) 0.5 part

The above-described materials were dispersed at room temperature for 5 hours by an attritor, so that a polymerizable monomer composition 1 was obtained.

<Preparation of Polymerizable Monomer Composition 2>

Polymerizable monomer composition 1 46.8 parts

Styrene 39.0 parts n-butyl acrylate 25.0 parts

Polar resin 1 10.0 parts (Styrene-methacrylic acid-methylmethacrylate-2-hydroxyethyl methacrylate copolymer, Mw=15200)

Polar resin 2 4.0 parts (Polyester resin which is polycondensation product between propion oxide-modified bisphenol A and terephthalic acid, Mw=9500)

Polar resin 3 1.0 part (Styrene-2-ethylhexyl acrylate copolymer containing 10 mass % of 2-acrylamide-2-methylpropane sulfonic acid, Mp=18000)

Behenyl Behenate 6.0 parts

Hydrocarbon wax (melting point 78° C.) 3.0 parts

The above-described materials were added into a temperature adjustable stirring tank and were increased in temperature to 60° C., followed by stirring for 1 hour, so that a polymerizable monomer composition 2.

<Granulation, Polymerization Steps>

The above-described polymerizable monomer composition 2 was added into an aqueous dispersion medium, and further, 7.0 parts of a polymerization initiator was added, and granulation was performed for 10 minutes while maintaining high-speed stirring at a temperature of 60° C. Thereafter, a stirring machine is changed to a propeller stirring machine, and the temperature was increased to 70° C., followed by reaction for 5 hours. Further, the temperature was increased to 80° C., and reaction was performed for 5 hours, and thereafter, a reaction mixture was cooled, so that a polymerization fine particle dispersion liquid was obtained.

<Washing, Drying, Classification Steps>

To the above-described polymerization fine particle dispersion liquid, 10%-hydrochloric acid was added, and a calcium phosphate fine particle dispersion agent was dissolved in the resultant liquid, followed by filtration, washing, and drying, and classification was performed using an air classifier, so that toner particles of 5.8 μm in weight-average particle diameter was obtained.

<Preparation of Hydrotalcite Particles 1>

Sodium fluoride 3.5 parts

Water 350.0 parts

The above-described aqueous solution was prepared, and 3.5 parts of hydrotalcite (240 nm in number-average particle diameter of primary particles) was added thereto. The resultant mixture was stirred at room temperature for 10 hours, followed by filtration, drying, and pulverization, so that hydrotalcite particles 1 were obtained. In line analysis in STEM-EDS mapping analysis, existence (presence) of fluorine inside the hydrotalcite particles was confirmed, so that F/Al=0.11 and Mg/Cl=2.45 were obtained.

<Hydrotalcite Particles 2>

The hydrotalcite (240 nm in number-average particle diameter of primary particles) used in preparation of the hydrotalcite particles 1 was used as hydrotalcite particles 2. In the line analysis in the STEM-EDS mapping analysis, existence of fluorine inside the hydrotalcite particles 2 was not confirmed.

<Preparation of Hydrotalcite Particles 3>

Methanol 50.0 parts

Fluorine-containing silicone (X-12-2430C, manufactured by Shin-Etsu Silicone Co., Ltd.) 0.3 part Hydrotalcite (240 nm in number-average particle diameter of primary particles) 5.0 parts The above-described materials were added and stirred at room temperature for 10 hours, and thereafter, 500 parts of water was added and stirred further for 1 hour, followed by filtration, drying, and pulverization, so that hydrotalcite particles 3 were obtained. In the line analysis in the STEM-EDS mapping analysis, existence of fluorine inside the hydrotalcite particles 3 was not confirmed, but the existence of fluorine at the surfaces of the hydrotalcite particles 3 was confirmed.

<Manufacturing Example of Toner 1>

To the above-obtained toner particles (100.0 parts), the hydrotalcite particles 1 (0.3 part) and hydrophobically treated silica (BET 380 $m^2/g$) (1.0 part) were externally added by a Mitsui Henschel mixer (Mitsui Miike Kakoki Co., Ltd.). An external addition condition was such that a number of stirring rotation and a mixing time were adjusted so as to provide a desired sticking ratio.

Thereafter, the resultant mixture was sieved by a mesh with an aperture of 200 μm, so that toner 1 was obtained. A sticking ratio of the hydrotalcite particles to the toner particles was 30%.

<Manufacturing Example of Toner 2>

Toner 2 was obtained similarly as in the manufacturing example of the toner 1 except that the hydrotalcite particles used was changed to the hydrotalcite particles 2 in the manufacturing example of the toner 1.

<Manufacturing Example of Toner 3>

Toner 3 was obtained similarly as in the manufacturing example of the toner 1 except that the hydrotalcite particles used was changed to the hydrotalcite particles 3 in the manufacturing example of the toner 1.

5. Effect Confirmation of the Present Invention

An effect of the present invention was confirmed using the above-described toner. By using a modified machine of LPB672C which is a printer manufactured by Canon Inc., image formation was carried out under a condition of a temperature of 30° C. and a humidity of 80% RH, and measurement of a fog density was performed. For the measurement of the fog (density), a reflection densitometer (Model TC-MOR-45 type, manufactured by Tokyo Denshoku Co., Ltd., use of green filter) was used, so that measurement of a reflectance (%) was performed. For the fog measurement, POST-ET or the like is stuck on a part of a sheet to be printed, and solid (white) image formation is carried out and the sheet is outputted. A reflectance of a portion where the POST-IT stuck on the output sheet is removed is taken as a reference reflectance, and the fog measurement was performed. The reflectance is different depending on a measuring portion, and a difference between a measured value of a portion where a value (of the reflectance) becomes minimum and a measured value (reference reflection) of the portion where the POST-IT was stuck on the sheet is measured as a fog value. A smaller numerical value of the measured fog value shows that a fog amount is smaller, and therefore, an image quality is better. As regards the fog amount, in the toner prepared in this embodiment, the hydrotalcite particles are added, and therefore, a toner charged amount is sufficient, so that the fog amount was good (level). As a specific numerical value of a good fog amount, there is a value of less than 1%.

Subsequently, whole surface solid black image formation was carried out under a condition of a temperature of 10° C. and a humidity of 10% RH with the above-described T, and image density measurement was performed. For density measurement, a densitometer eXact, manufactured by X-Rite Inc.) was used, so that the density measurement of black was performed.

In a whole surface block image in a low-temperature and low-humidity environment, compared with the toner in this embodiment, a lowering in density was confirmed in the toner 2 and the toner 3. As a change amount of the density, there is a lowering of 0.05 or more as a value of the densitometer, and a density lowering was observed on the image. The reason why the density was lowered in the toner 2 and the toner 3 would be considered that an excessive electrical charge was imparted to the toner by the hydrotalcite particles. On the other hand, in the toner other than the toner 2 and the toner 3, a surface charge distribution of the toner was able to be uniformized by the fluorine-containing hydrotalcite particles, and therefore the excessive electrical charge impartment as in the toner 2 and the toner 3 is not made. For that reason, it would be considered that the density lowering did not occur. Specifically, in the toner other than the toner 2 and the toner 3, a value of a ratio F/Al (element ratio) of an atom number concentration of the fluorine to an atom number concentration of the aluminum in the hydrotalcite particles is in an appropriate range (0.01 to 0.70). For that reason, it would be considered that an effect of the hydrotalcite particles as the microcarrier was obtained and the fog was good (level). Thus, in order to provide a good image quality, there is a need to put the F/Al of the hydrotalcite particles in the appropriate range.

Figure 13:
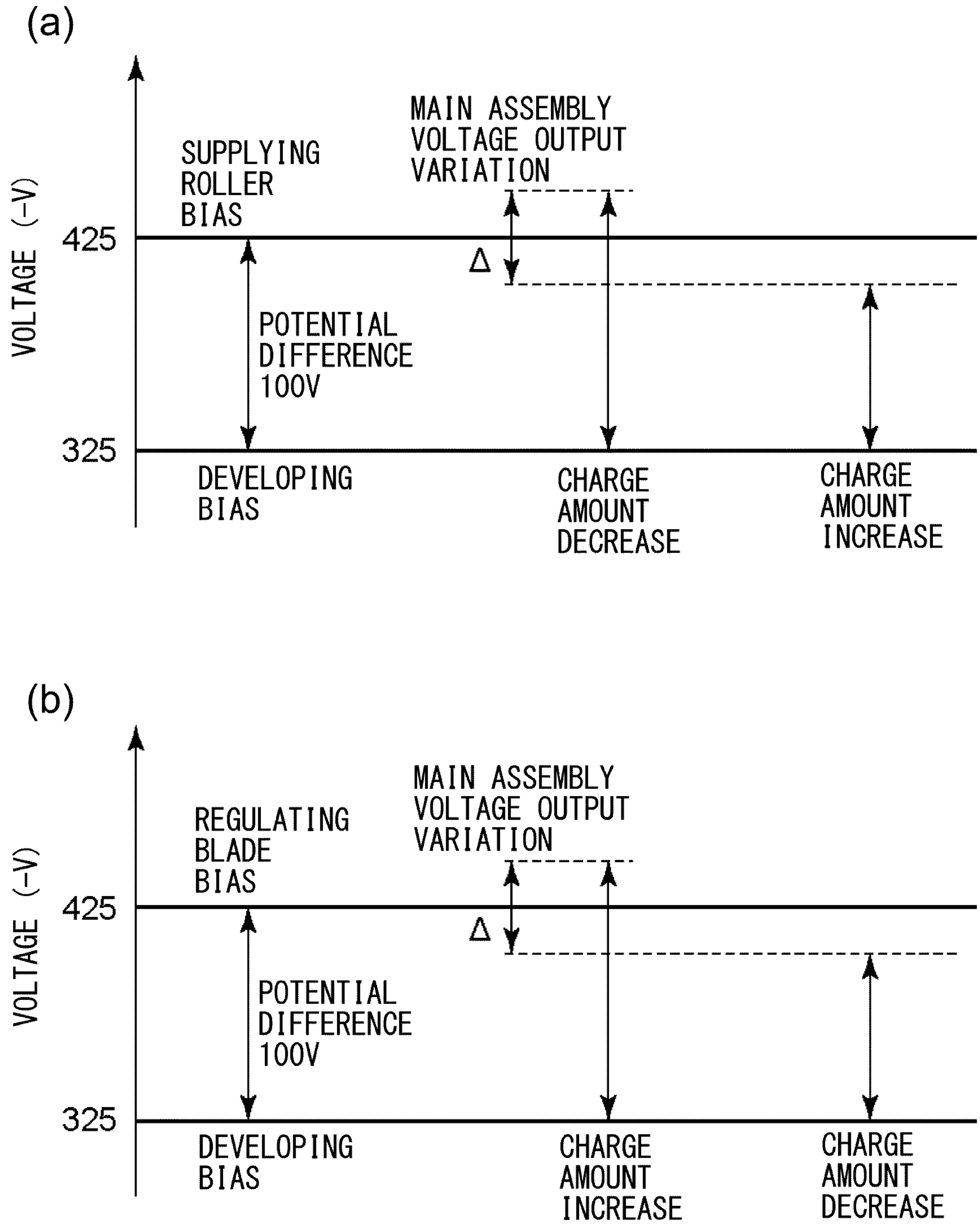
FIG. 13 includes relation diagrams when a supplying roller bias and a regulating blade bias are changed.

Subsequently, by using the toner 1 good in fog under the above-described high-temperature/high-humidity environment and in density under the low-temperature/low-humidity environment, an influence on the fog when each of the supply bias and the regulation was changed is shown. In this process cartridge, the supply/regulation biases are supplied from the same power source, but a change when each of the bias is supplied from a different power source will be described using FIG. 13.

First, the influence on the voltage applied to the supply roller 32 will be described. Part (a) of FIG. 13 simply shows a relationship of the supply bias relative to the developing bias. When the voltage applied to the supplying roller changes due to an output variation A of the main assembly, a toner supply amount at the contact portion between the supplying roller 32 and the developing roller 31 changes. Here, when a potential difference, which was −100 V, of the voltage applied to the supplying roller 32 relative to that for the developing roller 31 is changed to −120 V, the toner has the negative polarity, and therefore, the toner supply amount from the supplying roller 32 to the developing roller 31 becomes large. On the other hand, when the potential difference relative to the developing roller 31 is made −80 V, the toner supply amount from the supplying roller 32 to the developing roller 31 becomes small. When the potential difference becomes large, the supply amount becomes large, and the toner entering the regulating blade 33 increases in amount. When the toner entering the regulating blade 33 increases in amount, the toner amount of the toner passing through the contact portion between the developing roller 31 and the regulating blade 33 somewhat increases. The electrical charge impartment to the toner is performed in a certain amount by the developing roller 31 and the regulating blade 33, and therefore, when the toner amount increases, the electrical charge amount per toner weight of the toner on the developing roller 31 after passing through the regulating blade becomes small compared with before the toner amount increases. On the other hand, when the potential difference is made small, the toner supply amount of the toner from the supplying roller 32 to the developing roller 31 decreases. When the supply amount decreases, the toner amount of the toner passing through the contact portion between the developing roller 31 and the regulating blade 33 somewhat decreases, and therefore, the electrical charge amount per toner weight of the toner becomes large compared with before the toner amount decreases.

Next, the influence of the voltage applied to the regulating blade 33 will be described. Part (b) of FIG. 13 simply shows a relationship of a regulating blade bias relative to the developing bias. When the voltage applied to the regulating blade 33 is changed, the electrical charge amount per toner weight of the toner changes. The electrical charge of the toner is imparted when the toner passes through the contact portion between the developing roller 31 and the regulating blade 33, but an electrical charge imparting property changes depending on the potential difference formed in the contact portion. The electrical charge impartment is made by impartment by triboelectric charge due to contact between the toner and the developing roller 31 and between the toner and the developing blade 33 and by injection charging generated by a potential difference formed between the regulating blade 33 and the developing roller 31. This charge impartment to the toner is different depending on a use environment, but in general, when the potential difference between the developing roller 31 and the regulating blade 33 becomes large, the electrical charge of the toner becomes large. As described above, the electrical charge amount per toner weight changes also depending on the potential difference between the supplying roller 32 and the regulating blade 33.

Here, in order to generate voltages of the various power sources of the image forming apparatus 100, electron parts are combined with each other to generate the voltages. Further, the electron parts include variations such as tolerances, and therefore, have output variations A in power source voltages. The power sources include such output variations, and therefore, even when desired voltages are set, deviations of about several % generate in some instances. For example, as the supply/regulation bias, −100 V is set as the potential difference for the developing roller 31, but the potential difference becomes −80 V depending on a power source variation of the main assembly or becomes −120 V in another main assembly in some instances. The case where in the main assembly having such output variations A of the power source voltages, the voltage applied to the supplying roller 32 and the voltage applied to the regulating blade 33 are supplied from the common power source as described in this embodiment will be considered. The voltage applied to the supplying roller 32 and the voltage applied to the regulating blade 33 are supplied from the common power source, and therefore, there is no need to consider the variation in voltage output of the power source capable of being generated in the case where the voltages are applied to the supplying roller 32 and the regulating blade 33, respectively.

Figure 6:
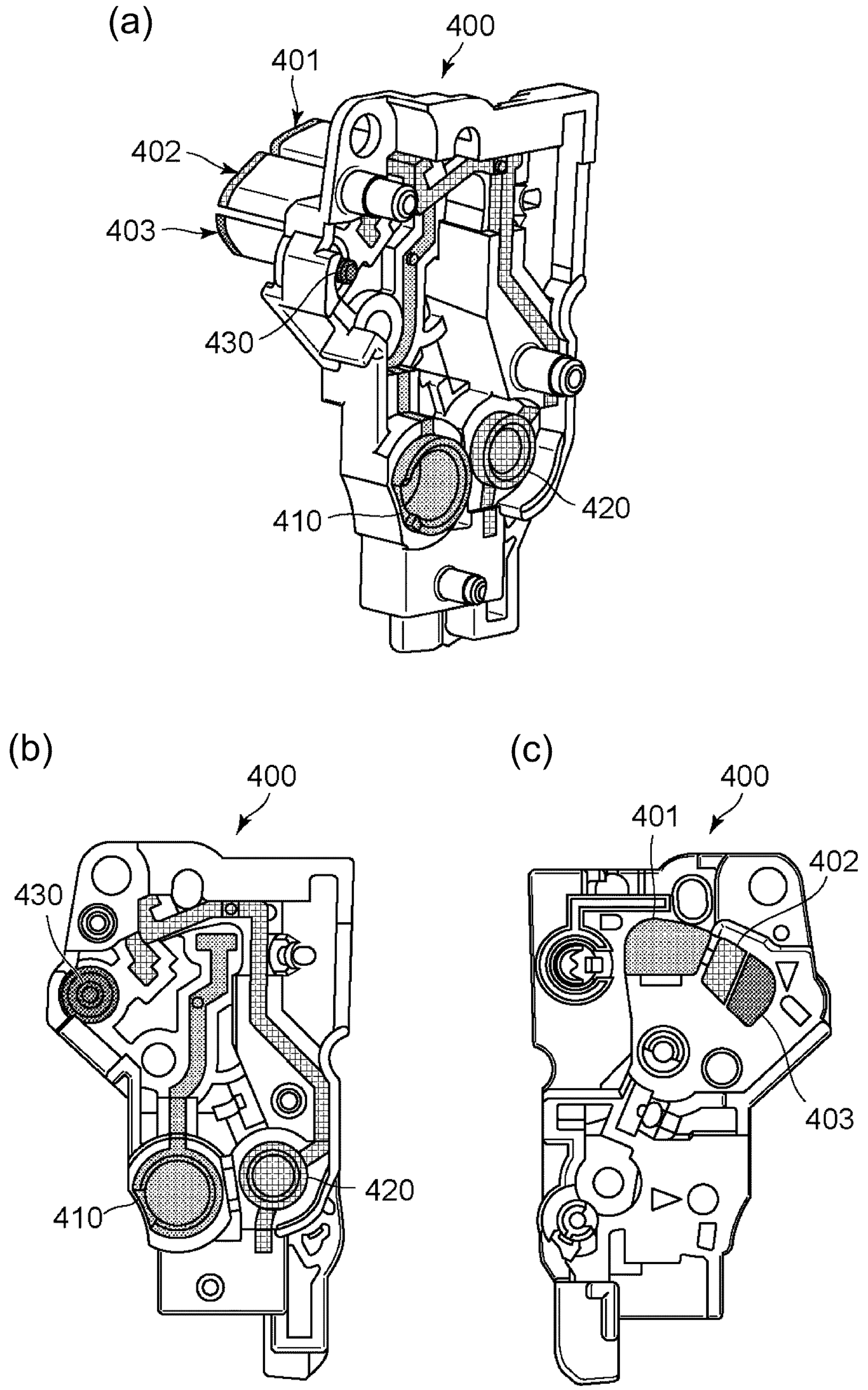
FIG. 6 includes views of voltage supplying (component) parts attached to a process cartridge of a comparison example.
Figure 7:
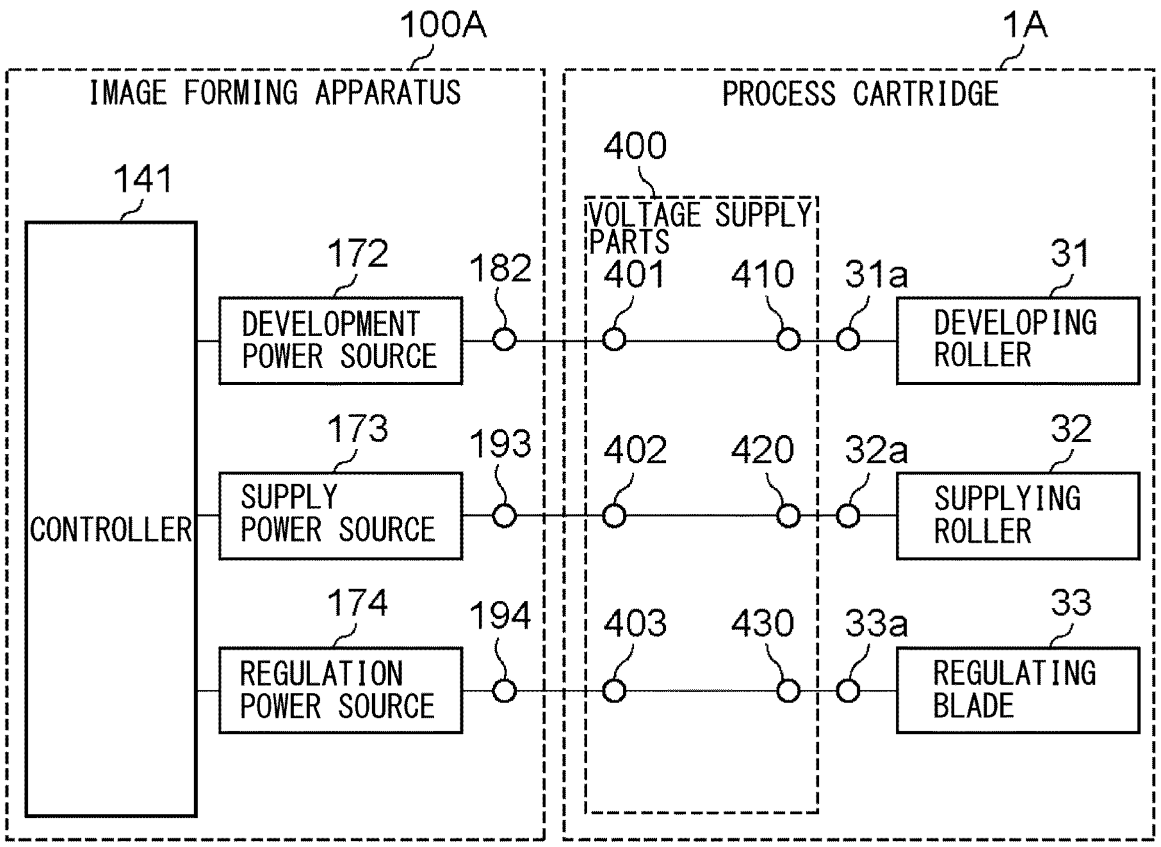
FIG. 7 is a circuit view of voltage supply from an image forming apparatus to the process cartridge of the comparison example.

More specifically, as a comparison example, description will be made using a process cartridge 1 such that voltages are supplied to the supplying roller 32 and the regulating blade 33, respectively, from different power sources. In a constitution of the comparison example, the case where voltages providing a potential difference of −100 V relative to the voltage applied to the developing roller 31 are applied as setting voltages to the supplying roller 32 and the regulating blade 33, respectively, will be described. FIG. 7 includes a perspective view (part (a) of FIG. 6) of a voltage supplying part 400 (including voltage supply parts) attached to the developing unit 2 in the process cartridge 1 used in the comparison example, a front view (part (b) of FIG. 6) of the voltage supplying part 400, and a rear view (part (c) of FIG. 6) of the voltage supplying part 400. FIG. 7 is a circuit view when the process cartridge in the comparison example is mounted. The process cartridge 1A in the comparison example is mounted in an image forming apparatus 100A including two power sources (173, 174) for supplying voltages to the supplying roller 32 and the regulating blade 33, respectively. As regards the development power source 172 and the developing voltage main assembly contact 182, constitutions thereof are the same as the constitutions of FIG. 4 in the embodiment 1. In the process cartridge 1A, a supply voltage main assembly contact 193 and a regulation voltage main assembly contact 194 are provided for supplying voltages individually to the supplying roller 32 and the regulating blade 33, respectively. When the process cartridge 1A is mounted in the image forming apparatus 100A, conduction is performed in the following manner. A supply voltage contact 402 and a regulating blade voltage contact 403 which are contacts disposed in the voltage supplying part 400 attached to the process cartridge 1, and the supply voltage main assembly contact 193 and the regulation voltage main assembly contact 194 which are disposed in the image forming apparatus 100A contact each other, respectively, and are (electrically) conducted to each other, respectively. The supply voltage contact 402 is formed by an electroconductive resin in the voltage supplying part 400 and is conducted from the supply voltage contact 402 to a supplying roller holding portion 420 (parts (a), (b), and (c) of FIG. 7, hatched portion), and supplies the voltage to the supplying roller 32. Similarly, the regulating blade voltage contact 403 is conducted to a regulating blade contact 430 contacting the regulating blade 33 in the voltage supplying part 400 (parts (a), (b), and (c) of FIG. 6, solid black portion), and supplies the voltage to the regulating blade 33. A developing voltage contact 401 is conducted to the developing roller holding portion 410 similarly as in FIG. 3, and supplies the voltage to the developing roller 31. The developing voltage contact 401, the supply voltage contact 402, and the regulating blade voltage contact 403 are insulated from each other, and therefore, the respective power source output voltages of the image forming apparatus 100A can be individually applied.

The main assembly outputting setting center voltages is capable of obtaining a desired quality image. However, in the main assembly having an output variation of the power source, for example, the following case would be considered. As described above, even when as a target, a supply voltage is intended to be applied so as to provide the potential difference of −100 V relative to the developing voltage, a potential difference (supplying bias) applied to the supplying roller 32 becomes −80 V relative to the developing bias in some cases. Of course, it is also assumed that the potential difference becomes larger than −100 V. When the potential difference between the supplying bias and the developing bias becomes smaller than a desired potential difference in absolute value, as described above, the electrical charge per toner weight of the toner increases. On the other hand, the potential difference between the supplying bias and the developing bias becomes −120 V, the electrical charge per toner weight of the toner decreases. As a result, for example, there is a possibility that the fog occurs. Particularly, in the toner to which the above-described fluorine-containing hydrotalcite is externally added, localization of the electrical charge distribution of the toner is small. For that reason, the potential difference between the supplying bias and the developing bias varies, so that a constitution in which the fog is liable to occur when the electrical charge of the toner decreases is employed. Similarly, when by the output variation A of the power source of the main assembly, the potential difference of the voltage (regulating bias) applied to the regulating blade 33 relative to the developing bias becomes smaller than a setting value (larger in absolute value), the electrical charge amount per toner weight of the toner decreases. As a result, the fog occurs. On the other hand, when the potential difference of the regulating bias relative to the developing bias becomes larger than the setting value (becomes smaller in absolute value), the fluorine charge amount per toner weight of the toner increases. Thus, in the developing unit 2 in which the supplying roller 32 and the regulating blade 33 have the power source contacts 402 and 403, respectively, even when desired voltage settings are intended to be controlled to the same between the supplying roller 32 and the regulating blade 33, outputs vary in some instances. That is, due to output variation of the power sources of the main assembly, particularly, in the toner to which the fluorine-containing hydrotalcite is externally added, there is a possibility that the fog occurs unexpectedly by a decrease in electrical charge amount per toner weight of the toner. Specifically, in the toner 1 of this embodiment, only the supplying bias varies, the potential difference changes from −100 V, which is a setting center of the potential difference, to −120 V, so that unexpected deterioration of the fog occurs. A value of the fog deteriorated in the toner 1 was a value of about 2 times a value of the fog deteriorated in the toner 2 under the same condition.

Further, this embodiment is the cleaner-less constitution, and as described above, it is required that the toner forming the toner image on the photosensitive member 11 includes toner having the electrical charge of the opposite polarity (positive polarity) and includes toner having the electrical charge close to 0 in a small amount. from this viewpoint, the toner to which the fluorine-containing hydrotalcite is externally added is not easy to be used in the cleaner-less constitution in the case where variations of the supplying bias and the regulating bias are taken into consideration. In the toner to which the fluorine-containing hydrotalcite is externally added, when the supply/regulation biases are constituted by the same contact as described in this embodiment, the following situation is formed. For example, the case where the potential difference relative to the developing roller 31 outputs −120 V, not −100 V, which is desired, due to the output variation of the power source will be assumed. The electrical charge of the toner is decreased by an increase in potential difference between the supplying roller 32 and the developing roller 31. However, on the other hand, the electrical charge of the toner is increased by an increase in potential difference between the regulating blade 33 and the developing roller 31. Accordingly, as a total, a fluctuation in electrical charge amount per toner weight of the toner can be made small. That is, the increase and the decrease of the electrical charge amount of the toner due to the deviation in potential difference can be canceled by each process. Specifically, in the toner other than the toner 2 and the toner 3 in this embodiment, the potential difference is changed from −100 V, which is the setting center of the potential difference, to −120 V by variation in supplying bias. Then, the deteriorated fog value was improved by about 20% as an improvement percentage by forming a stable potential difference by making the regulating bias and the supplying bias common.

Similarly for the above-described reason, when the potential difference relative to the developing roller 31 becomes −80 V, the electrical charge of the toner is increased by the potential difference between the supplying roller 32 and the developing roller 31, but the electrical charge of the toner is decreased by the potential difference between the regulating blade 33 and the developing roller 31. Accordingly, as a total, a fluctuation in electrical charge amount per toner weight of the toner can be made small.

In the constitution of this embodiment, the fluctuation in electrical charge amount per toner amount of the toner can be suppressed, and therefore, the occurrence of the fog can be suppressed for the constitution of the developing unit in which the voltages can be applied to the supplying roller and the regulating blade as in the comparison example. The constitution of this embodiment is desirable even in view of being the cleaner-less constitution.

In this embodiment, as a constitution in which the influence due to an output power source variation of the image forming apparatus 100, voltage contacts for supplying voltages to the supplying roller 32 and the regulating blade 33 of the developing unit 2 of the image forming apparatus 100 are made the same. By that, the electrical charge fluctuation due to the variation of the main assembly of the image forming apparatus 100 can be suppressed.

Figure 8:
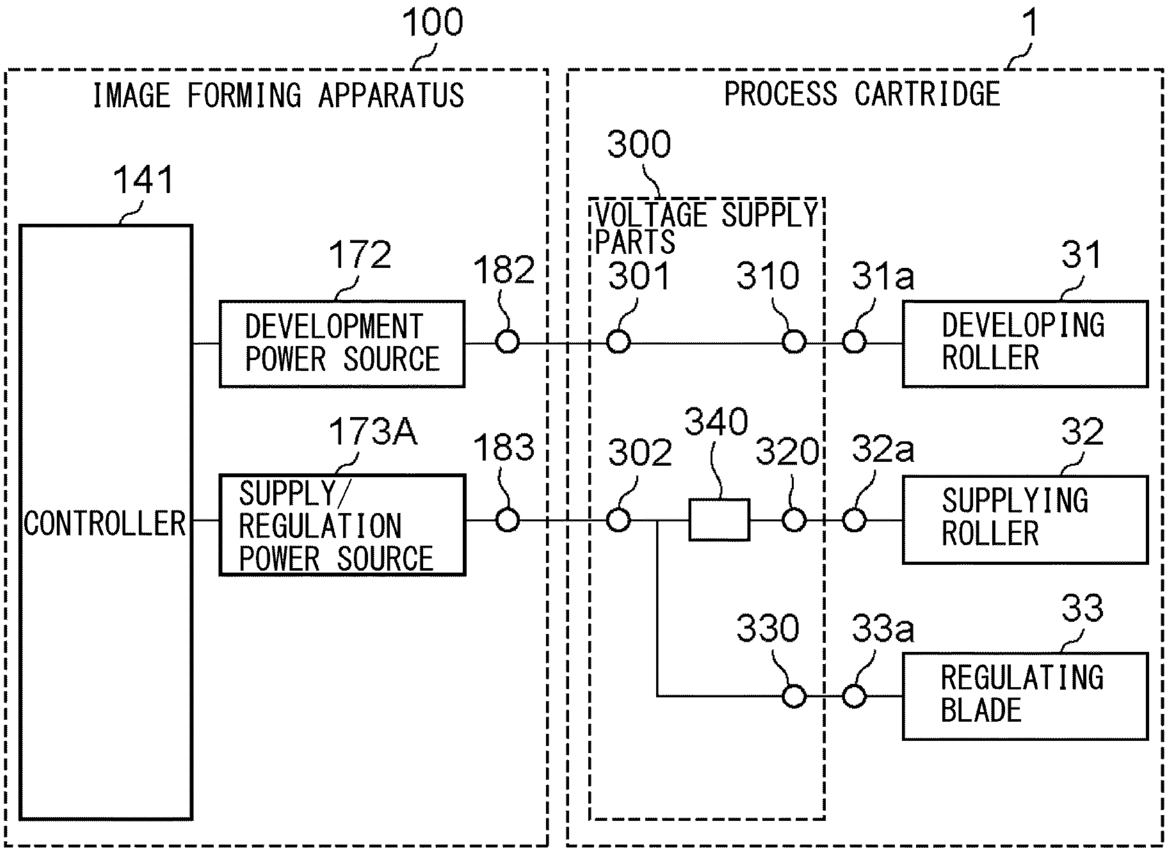
FIG. 8 is a circuit view of voltage supply from an image forming apparatus to a process cartridge in a modified embodiment of the embodiment 1.
Figure 9:
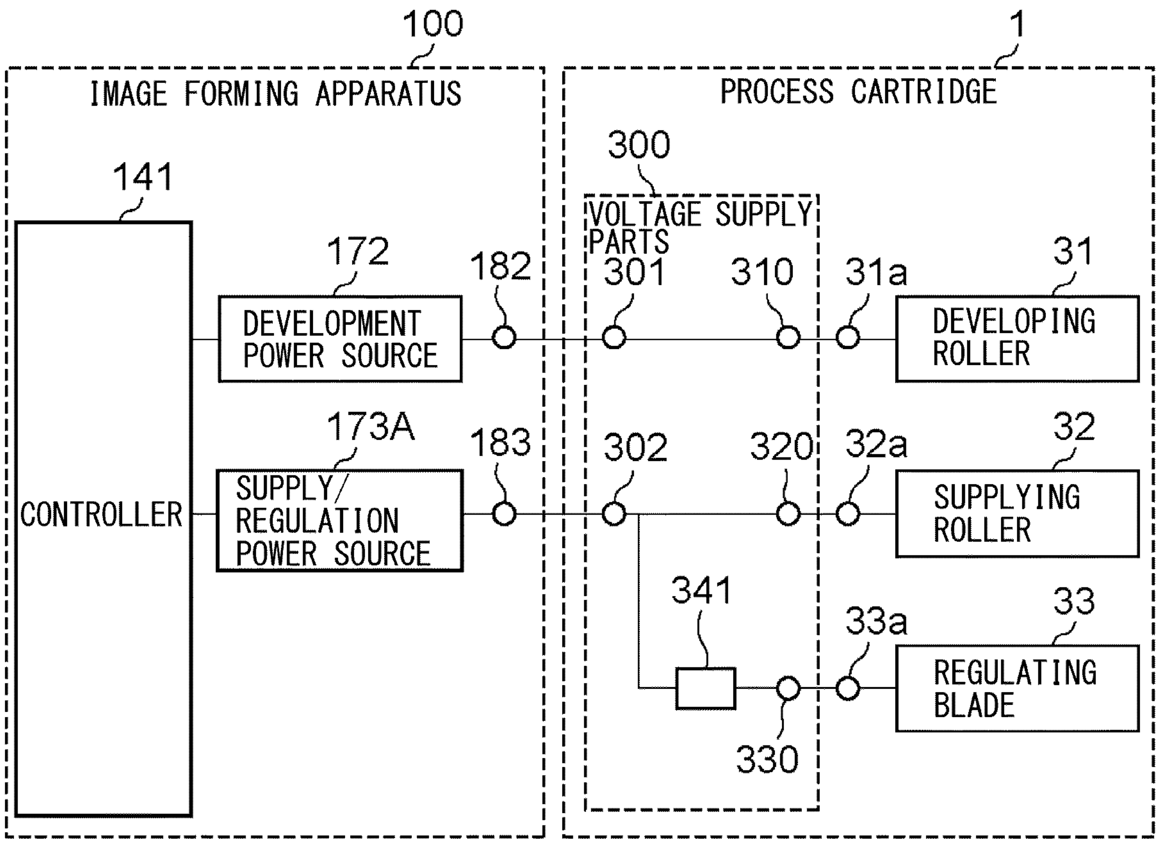
FIG. 9 is a circuit view of voltage supply from an image forming apparatus to a process cartridge in a modified embodiment of the embodiment 1.

When the voltage supply contacts in the developing unit 2 with the image forming apparatus 100 are the same, there is no need that the voltage supplied to the supplying roller 32 and the regulating blade 33 are the same. For example, the contacts between the image forming apparatus 100 and the developing unit 2 are the same, but a resistor, a diode, and the like may be inserted into a voltage supply path through which the voltage is supplied from the contact to the supplying roller 32 or the regulating blade 33. By employing such a constitution, the potential difference of the supplying roller 32 or the regulating blade 33 relative to the developing roller 31 can also be changed. A circuit view in which a resistor 340 is inserted into the voltage supply path until the path reaches the supplying roller 32 is shown in FIG. 8, and a circuit view in which a resistor 341 is inserted into the develop supply path until the path reaches the regulating blade is shown in FIG. 9. Even when the resistors 340 and 341 are inserted into the voltage supply path, the influence on the toner electrical charge fluctuation due to the power source variation can be reduced by an effect of the above-described aluminum charge impartment to the supplying roller 32, the regulating blade 33, and the toner. Also, in the case where the diode is inserted, a similar effect can be obtained.

Figure 10:
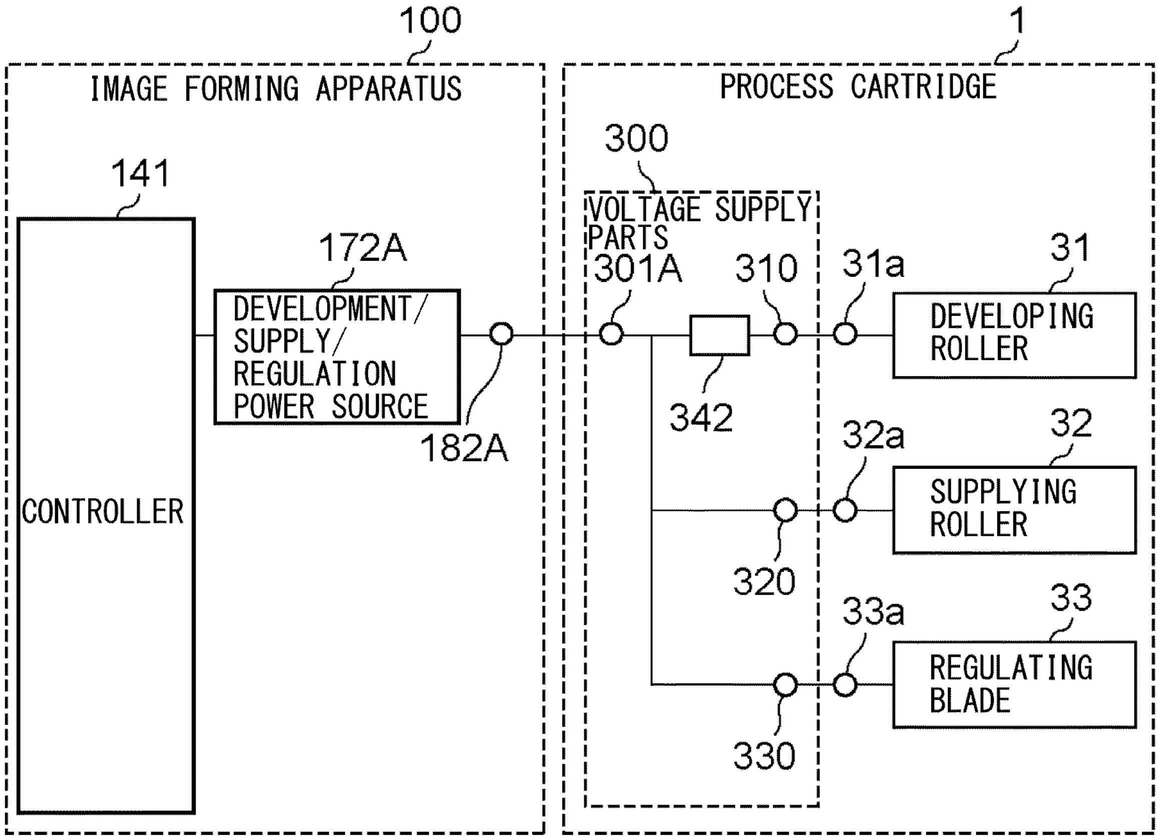
FIG. 10 is a circuit view of voltage supply from an image forming apparatus to a process cartridge in a modified embodiment of the embodiment 1.

Further, in FIG. 10, a circuit view when a single power source 172A and a single voltage output contact 182A of the image forming apparatus 100 are provided is shown. Even when a single voltage output from the image forming apparatus 100 is provided, the voltage can be adjusted in the following manner. A voltage applied to the developing roller 31 through a single contact 301A in the process cartridge 1 can be made smaller in magnitude of an absolute value than voltages applied to the supplying roller 32 and the regulating blade 33 by insertion of the resistor 342, the diode, or the like. Thus, the absolute values of the voltages applied to the supplying roller 32 and the regulating blade 33 can be made larger than the voltage applied to the developing roller 31, and even when there was an output variation in voltage, the voltages applied to the supplying roller 32 and the regulating blade 33 can be changed as described above.

Further, the image forming apparatus 100 in this embodiment had a constitution in which the process cartridge 1 was made detachably mountable thereto. An effect of this embodiment is not limited to the process cartridge, but is derived from the voltage supplying part attached to the developing unit 2 and the toner external addition. For that reason, the effect of this embodiment is also effective for an image forming apparatus to which the developing unit 2 and the photosensitive member unit 3 are separately mountable.

A cartridge constitution of the embodiment 1 has the following feature. The cartridge constitution includes the rotatable developing roller 31, the developing frame 36 for rotatably supporting the developing roller 31, and the toner accommodating portion 37 for accommodating the toner containing the toner particles and the external additive. The cartridge constitution includes the supplying roller 32 for supplying the toner to the surface of the developing roller 31 in contact with the surface of the developing roller 31, and the regulating blade 33 for regulating a layer thickness of the toner carried on the surface of the developing roller 31 in contact with the surface of the developing roller 31. The cartridge constitution includes the electrical contact 302 electrically connected to the supplying roller 32 and the regulating blade 33 and capable of receiving electric power from an outside. The external additive includes the hydrotalcite particles, and in the line analysis in the STEM-EDS mapping analysis of the toner, the fluorine exists inside the hydrotalcite particles.

Further, the fluorine and the aluminum may exist inside the hydrotalcite particles, and the value of the ratio (F/Al) of the atom number concentration (atom %) of the fluorine in the hydrotalcite particles to the atom number concentration (atom %) of the aluminum in the hydrotalcite particles is 0.01 to 0.65.

The toner sticking particle of the hydrotalcite particles to the toner particles is 10% or more.

The hydrotalcite particles may further contain the magnesium. Further, the value of the ratio (Mg/Al) of the atom number concentration (atom %) of the magnesium in the hydrotalcite particles to the atom number concentration (atom %) of the aluminum in the hydrotalcite particles is 1.5 to 4.0.

The number-average particle diameter of the primary particles of the hydrotalcite particles is 60 to 1000 nm.

The electrical element 340 may be provided between the supply electrode 302 and the supplying roller 32. The electrical element 341 may be provided between the supply electrode 302 and the regulating blade 33. The electrical element 342 may be provided between the supply electrode 301 and the developing roller 31.

The developing roller 31 is not electrically connected to the supplying roller 32 and the regulating blade 33, but is electrically connected to a second supply electrode (electrical contact) 301 different from a first supply electrode (electrical contact) which is a supply electrode electrically connected to the supplying roller 32 and the regulating blade 33. The photosensitive drum 11 which is an image bearing member and the charging roller 21 for charging the surface of the photosensitive drum 11 are provided.

The cleaner-less constitution in which after the toner used for development on the surface of the photosensitive drum 11 is transferred onto the outside, the toner remaining on the surface of the photosensitive drum 11 is collected by the developing roller 31 is employed. Further, in the case where the photosensitive drum 11 is rotated outside the image forming apparatus, during movement of a region of the photosensitive drum 11 forming the developing portion N1 to the charging portion N2, the region of the photosensitive drum 11 does not contact a contact member. The contact member is a cleaning member for cleaning the surface of the photosensitive drum 11.

Embodiment 2

Next, another embodiment of the present invention will be described. In an image forming apparatus of this embodiment, elements having identical or corresponding functions or constitutions to those of the image forming apparatus of the embodiment 1 will be omitted from detailed description by adding the same reference numerals or symbols as those in the embodiment 1.

1. Image Forming Apparatus

FIG. 11 is a schematic sectional view of an image forming apparatus 200 of this embodiment. The image forming apparatus 200 of this embodiment is a tandem-type full-color laser printer employing an intermediary transfer type capable of forming a full-color image by using an electrophotographic type.

The image forming apparatus 200 of this embodiment includes four image forming portion PY, PM, PC, and PK for forming images of yellow (Y), magenta (M), cyan (C), and black (K), respectively. As regards elements having identical or corresponding functions or constitutions in the image forming portions PY, PM, PC, and PK, suffixes Y, M, C, and K each indicating an element for either associated one of the colors are omitted and are collectively described in some instances.

The image forming portion P includes the process cartridge 1 so as to be detachably mountable. Four process cartridges 1Y, 1M, 1C, and 1K are four process cartridges for which colors of toner accommodated in each of the process cartridges are different from each other, and includes black (K) in addition to three primary colors of yellow (Y), magenta (M), and cyan (C). A constitution and an operation of the process cartridge 1 in this embodiment are similar to the constitution and the operation of the process cartridge 1 in the embodiment 1. The process cartridge 1 includes the photosensitive member 11, the charging roller 21, and the developing device 2. Further, the image forming portion P includes a primary transfer roller 211 which is a roller-type primary transfer member as a primary transfer means. Further, in this embodiment, the image forming apparatus 200 includes an exposure device 131 constituted as a single unit for exposing the photosensitive member, of each of the four image forming portions PY, PM, PC, and PK, to light.

An intermediary transfer belt 213 constituted by an endless belt rotatable as an intermediary transfer member so as to oppose the photosensitive member 11 of each of the image forming portions P is disposed. The intermediary transfer belt 213 is extended around a driving roller 214 and a tension roller 215 which are a plurality of stretching rollers (supporting rollers), and is stretched by imparting thereto a predetermined tension. The intermediary transfer belt 213 is rotated (circulated and moved) by rotational drive of the driving roller 214 by a driving force transmitted from a belt driving motor (not shown) as a driving source constituting a driving means. On an inner peripheral surface side of the intermediary transfer belt 213, the above-described primary transfer roller 211 is disposed correspondingly to the photosensitive member 11 of each of the image forming portions P. The primary transfer roller 211 presses the intermediary transfer belt 213 toward the photosensitive member 11 and forms a primary transfer portion (primary transfer nip) N3 which is a contact portion between the photosensitive member 11 and the intermediary transfer belt 213. Further, on an outer peripheral surface side of the intermediary transfer belt 213, in a position opposing the driving roller 214 also functioning as a secondary transfer opposite roller, a secondary transfer roller 212 which is a roller-type secondary transfer member as a secondary transfer means is disposed. The secondary transfer roller 212 contacts the driving roller 214 through the intermediary transfer belt 213 and forms a secondary transfer portion (secondary transfer nip) N4 which is a contact portion between the intermediary transfer belt 213 and the secondary transfer roller 212.

For example, during full-color image formation, toners of respective colors of Y, M, C, and K formed on the photosensitive members 11 are successively transferred (primarily transferred) superposedly on the rotating intermediary transfer belt 213 by the action of the respective primary transfer rollers 213 in the respective primary transfer portions N3. The toner images formed on the intermediary transfer belt 213 are transferred (secondarily transferred) onto the recording material R conveyed by being nipped by the intermediary transfer belt 213 and the secondary transfer roller 212 by the action of the secondary transfer roller 212 in a secondary transfer portion N4. The recording material R is conveyed from the paper feeding portion 181 toward the secondary transfer portion N4 by being timed to the toner images on the intermediary transfer belt 213.

Further, the image forming apparatus 200 of this embodiment is roughly divided for the image forming operation into a type of 1Y, 1M, and 1K and a type of 1K. This is for adapting to monochromatic printing, and is because the image forming operation is executed only in the PK during the monochromatic printing. During the monochromatic printing, the developing unit for only 1K contacts the photosensitive drum 11K, and the developing units for 1Y, 1M, and 1C are in a separation state from the photosensitive drums 11Y, 11M, and 11C, respectively. By employing such a constitution, wasteful consumption of 1Y, 1M, and 1C which do not contribute to the image formation is suppressed. When full-color printing is performed, image formation is executed for all the cartridges at appropriate timings.

Figure 12:
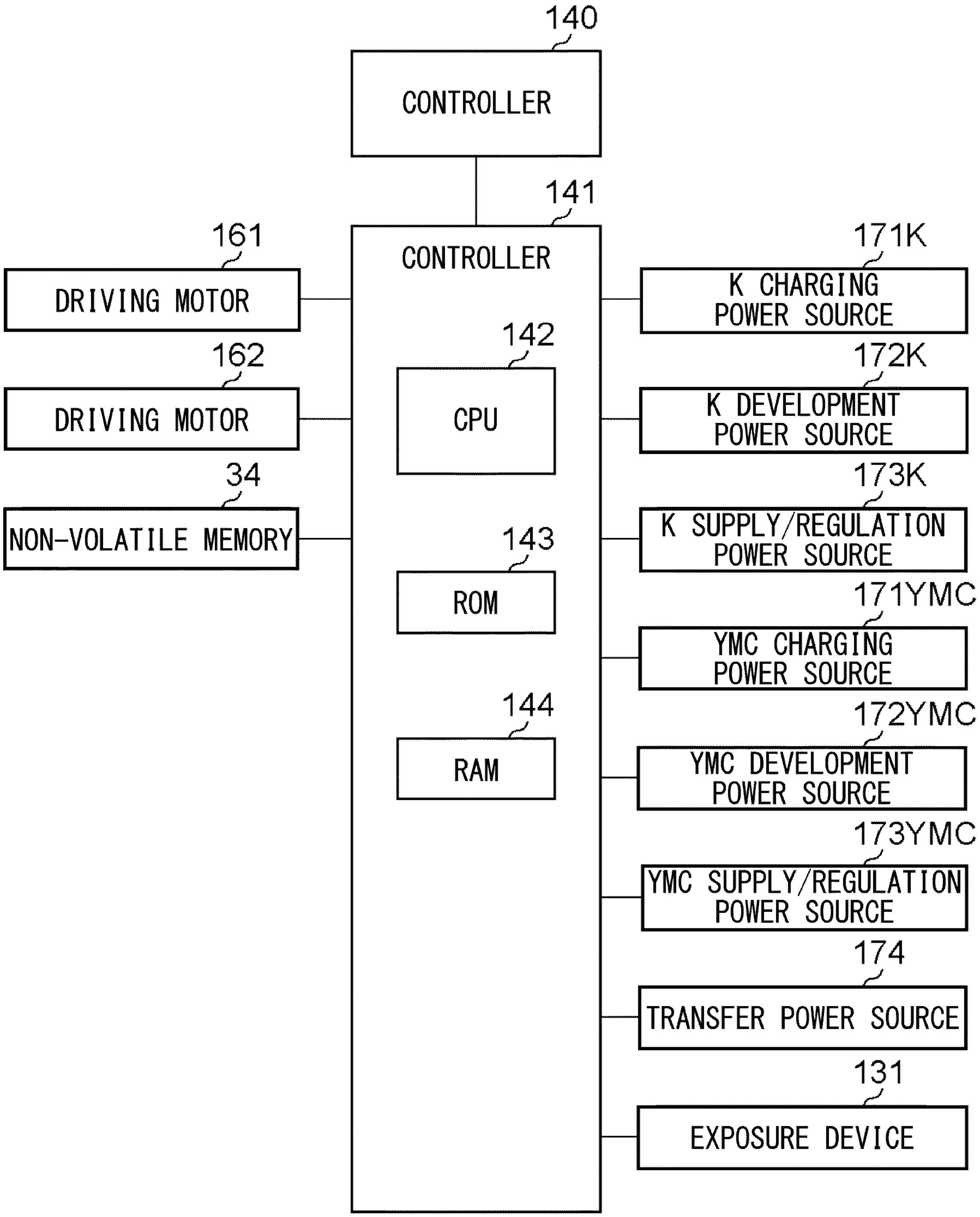
FIG. 12 is a schematic block diagram showing a control mode of the image forming apparatus of the embodiment 2.

In the image forming apparatus 200, a voltage supply type is roughly divided into a voltage supply type of PY, PM, and PC and a voltage supply type of PK. That is, voltages supplied to 1Y, 1M, and 1C are constituted so that the same voltage is supplied at the same timing (FIG. 12). Specifically, for colors, a charging power source 171YMC, a development power source 172YMC, and a supply regulation power source 173YMC are provided. For monochrome, a charging power source 171K, a development power source 172K, and a supply/regulation power source 173K are provided.

Such a full-color image forming apparatus 200, as regards an output image fog, fog of the four process cartridges are summed. Even when the fog of a single process cartridge is small, as a final output image, the fog becomes large.

As described in the embodiment 1, in the case where the electrical charge of the toner is decreased due to the output voltage variation of the main assembly power source for the voltage applied to the supplying roller 32 and the regulating blade 33, the fog is increased. Particularly, in the case of a process cartridge constitution such that for the color process cartridges such as 1Y, 1M, and 1C in this embodiment, voltages can be applied individually to the supplying roller 32 and the regulating blade 33, and a power source constitution of the image forming apparatus, the following phenomenon occurs in some instances. That is, even when settings of the applied voltages are made the same, depending on the voltage output variation, the fog amount for either cartridge is increased, so that the fog is further visualized as an output image. Also, when the toner with the electrical charge distribution of the toner small in localization, such as the toner to which the fluorine-containing hydrotalcite particles are externally added is used, the fog is suppressed by making the contacts to the supplying roller 32 and the regulating blade 33 the same in the process cartridge so that the fog is not visualized.

INDUSTRIAL APPLICABILITY

The cartridge applied to the present invention is provided.

The present invention is not limited to the above-described embodiments, and various changes and modifications are possible without departing from the spirit and the scope of the present invention. Accordingly, the following claims are appended to make the scope of the present invention public.

This application claims priority based on Japanese Patent Application No. 2022-120177 filed on Jul. 28, 2022, and Japanese Patent Application No. 2023-079803 filed on May 15, 2023, the entire contents of which are hereby incorporated by reference herein.

The invention claimed is:

1. A cartridge comprising:

a rotatable developing roller;

a developing frame for rotatably supporting the developing roller;

toner including toner particles and an external additive;

a toner accommodating portion for accommodating the toner;

a supplying roller for supplying the toner to a surface of the developing roller in contact with the surface of the developing roller;

a regulating blade for regulating a layer thickness of the toner carried on the surface of the developing roller in contact with the surface of the developing roller; and an electrical contact electrically connected to the supplying roller and the regulating blade and capable of receiving electric power from an outside, wherein the toner includes hydrotalcite particles as the external additive, and wherein in line analysis in STEM-EDS mapping analysis of the hydrotalcite particles, fluorine is detected inside the hydrotalcite particles.

2. The cartridge according to claim 1, wherein in the line analysis in the STEM-EDS mapping analysis of the toner, the fluorine and aluminum are detected inside the hydrotalcite particles, and wherein a value of a ratio (F/Al) of an atom number concentration (atom %) of the fluorine to an atom number concentration (atom %) of the aluminum in the hydrotalcite particles, obtained from a main component mapping of the hydrotalcite particles by the STEM-EDS mapping analysis of the toner, is 0.01 to 0.65.

3. The cartridge according to claim 2, wherein the hydrotalcite particles contain magnesium.

4. The cartridge according to claim 3, wherein a value of a ratio (Mg/Al) of an atom number concentration (atom %) of the magnesium to the atom number concentration (atom %) of the aluminum in the hydrotalcite particles is 1.50 to 4.00.

5. The cartridge according to claim 1, wherein a sticking ratio of the hydrotalcite particles to the toner particles is 10% or more.

6. The cartridge according to claim 1, wherein a number-average particle size of primary particles of the hydrotalcite particles is 60 nm to 1000 nm.

7. The cartridge according to claim 1, wherein an electrical element is provided between the electrical contact and the supplying roller.

8. The cartridge according to claim 1, wherein an electrical element is provided between the electrical contact and the regulating blade.

9. The cartridge according to claim 1, wherein the developing roller is not electrically connected to the supplying roller and the regulating blade, but is electrically connected to a second electrical contact different from a first electrical contact which is the electrical contact electrically connected to the supplying roller and the regulating blade.

10. The cartridge according to claim 9, wherein an electrical element is provided between the electrical contact and the developing roller.

11. The cartridge according to claim 1, comprising a photosensitive drum which is an image bearing member and a charging roller for electrically charging a surface of the photosensitive drum.

12. The cartridge according to claim 11, wherein after the toner used for development on the surface of the photosensitive drum is transferred onto an outside, toner remaining on the surface of the photosensitive drum is collected by the developing roller.

13. The cartridge according to claim 11, wherein in a case where the photosensitive drum is rotated, during movement of a region of the photosensitive drum, forming a developing portion where the photosensitive drum and the developing roller contact each other, to a charging portion where the photosensitive drum and the charging roller contact each other, the region of the photosensitive drum does not contact a contact member.

14. The cartridge according to claim 13, wherein the contact member is a cleaning member for cleaning the surface of the photosensitive drum.

* * * * *